US010747805B1

(12) United States Patent
Bragdon

(10) Patent No.: US 10,747,805 B1
(45) Date of Patent: Aug. 18, 2020

(54) CONTENT CAROUSEL IN A SOCIAL MEDIA TIMELINE

(71) Applicant: Twitter, Inc., San Francisco, CA (US)

(72) Inventor: Andrew Bragdon, Brentwood, CA (US)

(73) Assignee: Twitter, Inc., San Francisco, CA (US)

( * ) Notice: Subject to any disclaimer, the term of this patent is extended or adjusted under 35 U.S.C. 154(b) by 94 days.

(21) Appl. No.: 15/877,318

(22) Filed: Jan. 22, 2018

Related U.S. Application Data

(60) Provisional application No. 62/448,855, filed on Jan. 20, 2017.

(51) Int. Cl.
| | |
|---|---|
| *G06F 16/44* | (2019.01) |
| *G06F 3/0485* | (2013.01) |
| *G06Q 30/02* | (2012.01) |
| *G06N 20/00* | (2019.01) |
| *G06F 16/9535* | (2019.01) |
| *G06Q 50/00* | (2012.01) |

(52) U.S. Cl.
CPC .......... *G06F 16/447* (2019.01); *G06F 3/0485* (2013.01); *G06F 16/9535* (2019.01); *G06N 20/00* (2019.01); *G06Q 30/0251* (2013.01); *G06Q 50/01* (2013.01)

(58) Field of Classification Search
CPC .. G06F 16/447; G06F 16/9536; G06F 3/0485; G06F 30/0251; G06F 20/00; G06F 16/9535; G06Q 50/01; G06N 20/00
See application file for complete search history.

(56) References Cited

U.S. PATENT DOCUMENTS

| | | | | |
|---|---|---|---|---|
| 8,924,326 | B2* | 12/2014 | Arquette | H04L 51/32 |
| | | | | 706/45 |
| 9,117,227 | B1* | 8/2015 | Agrawal | G06Q 30/0242 |
| 9,361,322 | B1* | 6/2016 | Dutta | G06Q 30/00 |
| 9,449,050 | B1* | 9/2016 | Molina | H04L 51/32 |
| 9,454,771 | B1* | 9/2016 | Agrawal | G06Q 30/0242 |

(Continued)

OTHER PUBLICATIONS

Facebook Business, "Improving Ad Performance with the Carousel Format," Facebook, May 11, 2015, Retrieved from <https://www.facebook.com/business/news/carousel-ads> 4 pgs.

(Continued)

*Primary Examiner* — Maikhanh Nguyen
(74) *Attorney, Agent, or Firm* — Smith Baluch LLP

(57) ABSTRACT

Techniques of the disclosure are directed to a computing device creating and outputting, for display at client devices accessing a social media platform, targeted content. The computing device may receive candidate messages composed by users of a group of client devices, where the candidate messages each include a reference to the requisite product, brand, or market. If a candidate message has a determined interest score that satisfies a threshold interest score, the computing device includes the candidate message into a group of brand messages. The computing device may then send the targeted message to be output for display at another group of client devices, where the targeted message includes both an original portion and a carousel portion. The carousel portion includes a group of transitional windows, where each transitional window includes one of the brand messages from the group of brand messages.

22 Claims, 7 Drawing Sheets

(56) References Cited

U.S. PATENT DOCUMENTS

| | | | | |
|---|---|---|---|---|
| 9,483,529 | B1* | 11/2016 | Pasoi | H04L 51/32 |
| 9,892,431 | B1* | 2/2018 | Agrawal | G06Q 30/0242 |
| 10,003,560 | B1* | 6/2018 | Perkins | H04L 51/32 |
| 10,049,472 | B1* | 8/2018 | Croom | G06T 11/206 |
| 10,248,667 | B1* | 4/2019 | Agrawal | G06Q 30/00 |
| 10,250,547 | B1* | 4/2019 | Jain | H04L 51/32 |
| 2008/0195466 | A1 | 8/2008 | Wright | |
| 2010/0217670 | A1 | 8/2010 | Reis et al. | |
| 2012/0201362 | A1* | 8/2012 | Crossan | G10L 15/26 379/88.01 |
| 2013/0325755 | A1* | 12/2013 | Arquette | H04L 51/32 706/12 |
| 2014/0164082 | A1 | 6/2014 | Sun et al. | |
| 2015/0020100 | A1 | 1/2015 | Stark et al. | |
| 2018/0300757 | A1* | 10/2018 | Saxena | G06Q 30/0255 |

OTHER PUBLICATIONS

Facebook Business, "New Direct Response Features: Multi-Product Ads and Enhanced Custom Audiences from your Website," Jun. 26, 2014, Retrieved from <https://www.facebook.com/business/news/Multi-Product-Ads-and-Enhanced-Custom-Audiences-from-your-Website> 3 pgs.

Wagner, "You Can Now Scroll Between Twitter Promoted Tweets," Recode, Apr. 1, 2015, Retrieved from <http://www.recode.net/2015/4/1/11561060/you-can-now-scroll-between-twitter-promoted-tweets> 2 pgs.

Sloane, "Twitters new pitch to brands: Turn everyday fan tweets into ads," Digiday, Jan. 11, 2016, Retrieved from <http://digiday.com/platforms/twitters-new-pitch-brands-turn-everyday-fan-tweets-ads/> 3 pgs.

Buytaert, "Rotating Banners," Drupal, First accessed on on Apr. 15, 2016 from <https://www.drupal.org/node/1786134> , 6 pgs.

Runyon, "Carousel Interaction Stats," Erik Runyon, Jan. 22, 2013, Retrieved from <https://erikrunyon.com/2013/01/carousel-stats/> 4 pgs.

Nielsen, "Auto-Forwarding Carousels and Accordions Annoy Users and Reduce Visibility," Nielsen Norman Group, Jan. 19, 2013, Retrieved from <https://www.nngroup.com/articles/auto-forwarding/>.

Alex G., "Are carousels effective?" StackExchange User Experience, Aug. 22, 2011, Edited on Mar. 23, 2012, Retrieved from <http://ux.stackexchange.com/questions/10312/are-carousels-effective> 6 pgs.

Peatt, "An Exploration of Carousel Usage on Mobile E-Commerce Websites," Smashing Magazine, Feb. 9, 2015, Retrieved from <https://www.smashingmagazine.com/2015/02/carousel-usage-exploration-on-mobile-e-commerce-websites/> 25 pgs.

Frost, "A user with cerebral palsy is demonstrating how he can't get to carousel items fast enough before it advances," Twitter, Sep. 24, 2014, Retrieved from <https://twitter.com/brad_frost/status/514919131855224832> 1 pg.

Bragdon, Introducing conversational ads. Twitter Inc. Jan. 5, 2016. Accessed at https://blog.twitter.com/marketing/en_us/a/2016/introducing-conversational-ads.html, 6 pages.

* cited by examiner

CONTENT CAROUSEL IN A SOCIAL MEDIA TIMELINE

This application claims the benefit of U.S. Provisional Application No. 62/448,855, filed Jan. 20, 2017, the entire contents of which are incorporated by reference herein.

BACKGROUND

A social media platform leverages computing resources that programmatically collect, classify, and index worldwide content, which includes, for example, user generated content, live streams of sporting events, pod casts, creative content, movies, and TV/cable shows. Content collection includes receiving over a network, text, images, sound, and video, some or all of which may be previously generated and/or captured live via a mobile device. Content classification is implemented programmatically by leveraging rule engines, heuristic engines, and/or machine learning resources. The platform indexes content based on interest.

For user consumption, the platform provides interfaces, one of which is a timeline of content presented in reverse chronological order and demarked by distinct messages. Instances of the timeline are generated for particular users or particular groups of users based on corresponding interest and social graphs. The timelines are refreshed in real-time and at global scale, for example, when new content is available and especially when an event or topic of interest is trending.

SUMMARY

In one implementation, the social media platform generates and embeds a carousel of content in a reversed chronological timeline in which a user may consume content by scrolling up or down to introduce portions of the timeline into a display screen. The carousel presents content related to a particular topic of interest, e.g., a breaking news event, a consumer product of interest, and a recently released song from a previously unknown artist. The carousel has content that, figuratively speaking, loops across the display screen (like a carousel, either automatically or by user swiping gestures) without any up or down scrolling of the timeline, thus allowing the user to consume the content of the carousel without losing track of her place in the timeline. Content for the carousel are programmatically curated by leveraging machine learning models, e.g., neural networks and regression models, that predict interest based on stated preferences and historical behavior, examples of which include clicks, follows, likes, and other engagements. Content curated includes user-generated content, creative content, as well as any other content available on the platform. Carousel creation for a particular user is triggered when the platform detects a trend predicted to be of interest to the user. Like carousel content curation, trend detection for triggering carousel creation is implemented by leverage machine learning that predicts trends based on any combination of time (freshness), topicality, trustworthiness, geolocation, user preferences and past actions, as well as any other feature that may inform about user interest.

One compelling trigger is a trending topic about a newsbreaking event, programmatically detectable by a spike in a velocity graph of a number of messages over time. In this case, the platform generates, in real-time and while the event is still breaking, a carousel that includes both user generated content and news publisher content describing and commenting about the event and embeds that carousel into timelines of users who the platform predicts would be interested.

Another compelling trigger is brand buzz reaching a threshold. In this case, the platform generates, in real-time and while the buzz is still above the threshold, a carousel that includes both creative (also referred to as "original") and user generated content related to the branded product of interest and embeds that carousel into timelines of users who the platform predicts would be interested.

Alternatively, for timelines that scroll across a display screen, the carousel loops up and down. Whatever the case, the carousel is able to loop without the timeline being scrolled so the user is able to consume its content without losing her place in the timeline.

In some examples, a method includes receiving, by a computing device and from an information distribution system, a first group of one or more messages composed by one or more users of a first group of one or more client devices accessing a social media platform. Each of the messages in the first group of one or more messages includes a reference to a particular brand. The method further includes determining, by the computing device, an interest score for a candidate message based at least in part on content of the candidate message. The candidate message is included in the first group of one or more messages. The method also includes, responsive to determining that the interest score satisfies a threshold interest score, inserting, by the computing device, the candidate message into a group of one or more brand messages. Each brand message in the group of one or more brand messages includes a reference to the particular brand. The method further includes sending, by the computing device and to the information distribution system, a targeted message to be output for display at a second group of one or more client devices. The targeted message comprises an original portion and a carousel portion. The carousel portion comprises a group of one or more transitional windows, where each transitional window in the group of one or more transitional windows includes one of the brand messages in the group of one or more brand messages. The original portion comprises content formed at the computing device.

In some examples, a computing device includes at least one processor and at least one non-transitory computer-readable storage medium storing instructions that are executable by the at least one processor to receive, from an information distribution system, a first group of one or more messages composed by one or more users of a first group of one or more client devices accessing a social media platform. Each of the messages in the first group of one or more messages includes a reference to a particular brand. The instructions are further executable by the at least one processor to determine an interest score for a candidate message based at least in part on content of the candidate message. The candidate message is included in the first group of one or more messages. The instructions are further executable by the at least one processor to, responsive to determining that the interest score satisfies a threshold interest score, insert the candidate message into a group of one or more brand messages. Each brand message in the group of one or more brand messages includes a reference to the particular brand. The instructions are also executable by the at least one processor to send, to the information distribution system, a targeted message to be output for display at a second group of one or more client devices. The targeted message comprises an original portion and a carousel portion. The carousel portion comprises a group of one or more transitional windows, where each transitional window in the group of one or more transitional windows includes one of the brand messages in the group of one or more brand messages. The original portion comprises content formed at the computing device.

In some examples, a non-transitory computer-readable storage medium is encoded with instructions that, when executed, cause at least one processor of a computing device to receive, from an information distribution system, a first group of one or more messages composed by one or more users of a first group of one or more client devices accessing a social media platform. Each of the messages in the first group of one or more messages includes a reference to a particular brand. The instructions further cause the computing device to determine an interest score for a candidate message based at least in part on content of the candidate message. The candidate message is included in the first group of one or more messages. The instructions further cause the computing device to, responsive to determining that the interest score satisfies a threshold interest score, insert the candidate message into a group of one or more brand messages. Each brand message in the group of one or more brand messages includes a reference to the particular brand. The instructions also cause the computing device to send, to the information distribution system, a targeted message to be output for display at a second group of one or more client devices. The targeted message comprises an original portion and a carousel portion. The carousel portion comprises a group of one or more transitional windows, where each transitional window in the group of one or more transitional windows includes one of the brand messages in the group of one or more brand messages. The original portion comprises content formed at the computing device.

In some examples, an apparatus includes means for receiving, from an information distribution system, a first group of one or more messages composed by one or more users of a first group of one or more client devices accessing a social media platform. Each of the messages in the first group of one or more messages includes a reference to a particular brand. The apparatus further includes means for determining, using a machine learning model, an interest score for a candidate message based at least in part on content of the candidate message. The candidate message is included in the first group of one or more messages. The apparatus further includes, responsive to determining that the interest score satisfies a threshold interest score, means for inserting the candidate message into a group of one or more brand messages. Each brand message in the group of one or more brand messages includes a reference to the particular brand. The apparatus further includes means for sending, to the information distribution system, a targeted message to be output for display at a second group of one or more client devices. The targeted message comprises an original portion and a carousel portion. The carousel portion comprises a group of one or more transitional windows, where each transitional window in the group of one or more transitional windows includes one of the brand messages in the group of one or more brand messages. The original portion comprises content formed at the computing device.

The above techniques may enable a computing device to create a targeted message that includes both an original portion and a carousel portion, rather than limiting a creator to only a single message or a single nested message. These techniques further enable a content provider, such as an advertiser, to include multiple forms of content, including organic content and user generated content, within a single targeted message, thereby increasing the amount of content provided to the user without increasing the size of the content on the screen of the user's computing device. In some instances, media may be more effective in conveying information regarding a product. In other instances, user-generated content created by a party influential to the target of the content may be more effective in advertising a product. By including the group of transitional windows that each include separate brand messages, each of which may further include the above-described media or user-generated content, a content provider may increase the effectiveness of its targeted messages by increasing the amount and variety of the content within the content provider's targeted messages without necessarily crowding the graphical user interface with larger message windows. Further, in a large scale social media environment that requires real-time communication, distribution, and analysis, the techniques described herein more adequately utilize computing resources by enabling multiplicatively more information to be transferred between devices in the same message. By developing a machine learning model that narrows down the universe of messages on the social media platform to messages that meet a particular interest score, the computing device saves processing time and reduces the amount of inputs required to gather this information, as opposed to what could be a huge or nearly infinite number of manual queries that, due to the time it would take to process each query and analyze the results, would be outdated before the results are even ascertained.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
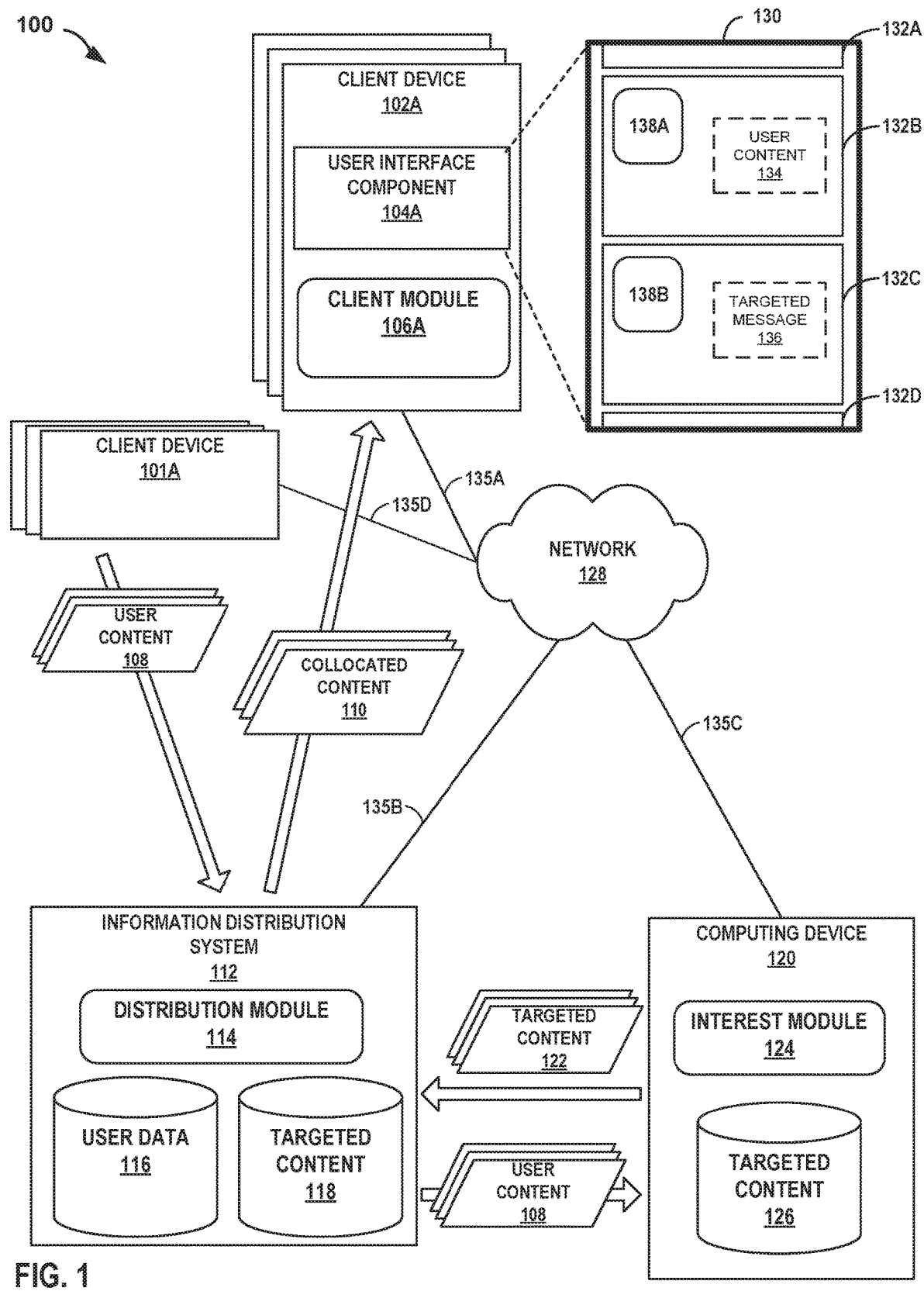
FIG. 1 is a conceptual diagram illustrating an example system including a computing device that is configured to create and output, for display at one or more client devices, targeted content that includes a carousel portion, in accordance with one or more aspects of the present disclosure.

Techniques of the disclosure are directed to a computing device creating and outputting, for display at client devices, targeted content that includes a carousel portion having transitional windows that each contain user-generated content. Such targeted content may provide users of the client devices with a compact yet detailed message that includes both content formed at the computing device and a series of user-generated content referencing a particular product, brand, or market. In creating this targeted content, the computing device may receive candidate messages composed by one or more users of a group of client devices, where the candidate messages each include a reference to the requisite particular product, brand, or market. If a candidate message has a determined interest score that satisfies a threshold interest score, the computing device includes the candidate message into a group of one or more brand messages. The computing device may then send the targeted message to be output for display at another group of client devices, where the targeted message includes both an original portion and a carousel portion. The original portion may include content formed at the computing device itself. The carousel portion includes a group of one or more transitional windows, where each transitional window includes one of the brand messages from the group of one or more brand messages that each reference the particular product, brand, or market. The transitional windows, when displayed, are cycled horizontally within the targeted message, providing a visual contrast to the messages within the message stream, which typically scroll vertically. In some examples, the original portion may be static while the carousel portion is transitionally displayed. In other examples, the carousel portion includes the original portion, and all parts of the targeted message are transitionally displayed.

Many social networking applications provide a limited amount of space in a graphical user interface for any message, including targeted content, to be displayed. By creating a targeted message that includes both an original portion and a carousel portion, rather than limiting a creator to only a single message, a content provider, such as an advertiser, may include multiple forms of content, including organic content and user generated content, within a single targeted message. In some instances, media may be more effective in conveying information regarding a product. In other instances, user-generated content created by a party influential to the target of the content may be more effective in advertising a product. By including the group of transitional windows that each include separate brand messages, each of which may further include media, a content provider may increase the effectiveness of its targeted messages by increasing the amount and variety of the content within the content provider's targeted messages without necessarily crowding the graphical user interface with larger message windows. Further, in a large scale social media environment that requires real-time communication, distribution, and analysis, the techniques described herein more adequately utilize computing resources by enabling multiplicatively more information to be transferred between devices in the same message. By developing a machine learning model that narrows down the universe of messages on the social media platform to messages dealing only with a common category of entities, the computing device saves processing time and reduces the amount of inputs required to gather this information, as opposed to what could be a huge or nearly infinite number of manual queries that, due to the time it would take to process each query and analyze the results, would be outdated before the results are even ascertained.

FIG. 1 is a conceptual diagram illustrating a system 100 including a computing device 120 that is configured to create and output, for display at client devices, targeted content that includes a carousel portion, in accordance with one or more aspects of the present disclosure. System 100 includes client device 101A, client device 102A, information distribution system 112, computing device 120, and network 128.

Network 128 represents any communication network (e.g., public, private, commercial, governmental, or residential) that communicatively links two or more computing devices or systems for the transmission of information. For example, network 128 may be a wireless and/or wired network for transmitting data between two or more computing devices located at two or more different physical locations. In some examples, network 128 may represent the Internet. Client device 102A, information distribution system 112, and computing device 120 may send and receive data via network 128 using various suitable communication techniques. For instance, data may be transmitted between the devices using communication links 135A-135D, which may be wired and/or wireless links. Network 128 may include any required hardware for communicatively linking computing client device 102A, client device 101A, information distribution system 112, and computing device 120. For example, network 128 may include various switches, hubs, routers, and other network equipment that provides for the exchange of information between the devices.

Client device 101A and 102A each represent any type of personal computing device from which a person can view, listen to, feel, or otherwise obtain output based at least in part on information received via a network, such as network 128. For example, client device 101A or client device 102A may be a laptop computer, a mobile telephone, a tablet computer, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user. Although not shown in FIG. 1, client device 101A may include similar components as client device 102A that perform similar functions.

Client device 102A includes user interface component 104A. User interface component 104A may include various technologies for receiving input from, and/or outputting information to, a user of user device 102A. For example, user interface component 104A may include a microphone, a touch screen or other type of presence-sensitive screen, and other types of sensors and input devices for receiving input from a user. User interface component 104A may include a display (e.g., liquid crystal (LCD), light emitting diode (LED), organic light-emitting diode (OLED), or any other type of display), a speaker, a haptic feedback device, or any other type of output device for outputting visible, audible, and/or haptic feedback type information to a user of client device 104A. Although illustrated as a presence-sensitive display integrated with client device 102A, in some examples, user interface component 104A may be a display device, such as a monitor integrated in a laptop computer, or a standalone monitor coupled to a desktop computing device, to name only a few examples.

User interface component 104A may provide a user interface from which a user may interact with client device 102A to cause client device 104A to perform one or more operations. For example, user interface component 104A may give a user access to a service, provided by information distribution system 112, for receiving content (e.g., social media, news, television, streaming audio, streaming video, or other types of content) distributed across network 128. As further described in this disclosure, information distribution system 112 may provide content via network 128 to client device 102A. Client device 102A may process and output the content as one or more graphical images, sounds, and haptic-feedback sensations, at user interface component 104A.

Client device 102A may include a client module 106A. Client module 106A may send information generated by a user to and receive information from an information network provided by information distribution system 112. For instance, a user may have a user account stored at information distribution system 112. The user account may include a unique identifier (e.g., a username) for the user, authentication credentials, and personal information (e.g., name, phone number, email address, home address, to name only a few examples). Client module 106A may authenticate with information distribution system 112 based at least in part on authentication credentials provided by the user to client device 102A.

In some examples, client module 106A may provide a graphical user interface (GUI) that enables a user to generate or otherwise compose user content that client module 106A sends to information distribution system 112. Such user content may include text, images, video, and/or audio information. In some examples, a user may compose a message that includes various content. In addition to content, a message may include one or more hashtags and/or mention tags. In some examples, a hashtag may represent or otherwise identify a particular topic associated with the content of a message. As such, a user composing a message on a particular topic may associate hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates user content, client module 106A may send user content to information distribution system 112, which may process and/or distribute the user content as further described in this disclosure.

Similar messages may be composed using client device 101A. In some examples, a user of client device 101A may compose a message that includes various content. In addition to content, a message may include one or more hashtags and/or mention tags. In some examples, a hashtag may represent or otherwise identify a particular topic associated with the content of a message. As such, a user composing a message on a particular topic may associate hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates user content 108, client device 101A may send user content to information distribution system 112, which may process and/or distribute user content 108 as further described in this disclosure.

Client module 106A may enable the user to perform one or more functions associated with user content. For instance, client module 106A may enable a user to "share," "re-share," "read," and "follow" content as well as "follow" and "mention" other users. In some examples, "sharing" a message or content may refer to composing an original message or original content that is subsequently distributed by information distribution system 112 to other users. In some examples, "re-sharing" a message or content may refer to an operation initiated by a user to re-post a message or content that was originally generated by another user. In some examples, "reading" a message or content may refer to an activity of a user to view the message or content. In some examples, "following" may refer to an operation initiated by a user to subscribe to messages and/or user content of another user. As such, a user that follows a particular user may receive updates of messages and/or user content generated by the particular user. In some examples, "mentioning" a particular user may refer to an operation initiated by a user to identify or otherwise associate the particular user with a message or user content.

Client module 106A may perform operations described herein using software, hardware, firmware, or a mixture of both hardware, software, and firmware residing in and executing by client device 102A or at one or more other remote computing devices. As such, client module 106A may be implemented as hardware, software, and/or a combination of hardware and software. Client device 102A may execute client module 106A as or within a virtual machine executing on underlying hardware. Client module 106A may be implemented in various ways. For example, client module 106A may be implemented as a downloadable or pre-installed application or "app." In another example, client module 106A may be implemented as part of an operating system of client device 102A.

As shown in FIG. 1, system 100 also includes information distribution system 112. Information distribution system 112 may implement techniques of this disclosure to detect trends in user-generated content based at least in part on one or more hashtags and provide user information regarding the authors of candidate messages to computing device 120. Information distribution system 112 may be implemented as one or more computing devices, including but not limited to: desktop computers, laptop computers, mainframes, servers, cloud computing systems, and the like.

Information distribution system 112 may include data and one or more modules, that when executed perform one or more operations. For example purposes, information distribution system 112 includes distribution module 114, user data 116, and targeted content 118; however, information distribution may include more or fewer modules or data in other examples. User data 116 may include data representing user accounts and demographic data about each user. As described above, a user account for a user of information distribution system 112 may include but is not limited to: a user name, password, phone number, email address, and home address. In some examples, user data 116 may also include, current location of the user, devices authenticated with the user, interests of the user, history of content generated by the user, history of content read and/or followed by a user, hashtags and/or mention tags used by the user, other users followed by the user, other users following the user, private messages sent and/or received by the user, and/or search history of the user, to name only a few examples.

For instance, information distribution system 112 may include targeted content 118. Targeted content may include any targeted content created by computing device 120 or any number of similar computing devices. In the instance where targeted content 118 includes targeted content created by computing device 120, information distribution system 120 may receive targeted content 122 (i.e., targeted content created by computing device 120) from computing device 120 and store the received targeted content 122 in targeted content 118.

Information distribution system 112 may also include distribution module 114. Distribution module 114 may construct and maintain information generated by users and/or operators of information distribution system 112. Distribution module 114 may receive user content 108 from one or client devices, and store and organize the user content in the information network. The user content may be stored and organized using any number of datastores and data structures, such as but not limited to graphs, lists, tables, a Relational Database Management System (RDBMS), Object Database Management System (ODBMS), and/or Online Analytical Processing (OLAP) system.

Distribution module 114 may parse or analyze user content to share or otherwise redistribute the user content to other users of information distribution system 112. For example, numerous users may each share or re-share content for a particular topic, and include or associate hashtag for the topic with the content. As an example, multiple users may each share content about the Olympics and include a hashtag #Olympics with the content (e.g., text and/or pictures). Distribution module 114 may receive the content and parse the hashtag #Olympics to structure content associated with the hashtag as searchable. In this way, if a user wishes to view all content associated with #Olympics, the user may submit a query to distribution module 114, which may return a set of content or messages that include the hashtag #Olympics. In some examples, distribution module 114 may automatically send to a user's client device, without additional user intervention, content or messages that include the hashtag #Olympics, if the user previously searched for, shared, re-shared, and/or viewed content associated with the hashtag #Olympics.

Distribution module 114 may parse or analyze user content to share or otherwise redistribute the user content to other users of information distribution system 112 based at least in part on whether a user is following another particular user or has mentioned the particular user. For instance, if the user provides user input to client module 106A to follow a particular user, information distribution system 112 may receive an indication of the user input and store the indication with the user's account. When the particular user shares or re-shares content, information distribution system 112 may send the content to client device 102A such that the user can view the content. As another example, if the user mentions the particular user in shared or re-shared content, information distribution system 112 may receive the content and send the content or notification of the mention to a client device of the particular user that was mentioned. In some examples, distribution module 114 may store information about user content viewed by a particular user. For instance, client module 106A may send data that indicates the user has viewed specific user content to information distribution system 112. Distribution module 114 may store data that indicates the user has viewed the specific user content. Although a number of examples above have described how distribution module 114 determines relationships between user content and redistributes user content to client devices, many other examples of distributing content and determining relationships are also possible.

In some instances, the amount of content associated with a particular hashtag may grow or decline rapidly relative to content associated with other hashtags. The rapid change may be due to a particular event, controversy, person, or topic that captures or loses the interest of a large audience of users. Such change in the increase or decrease of content associated with the hashtag may represent a trend. A magnitude of a trend may represent the degree interest or engagement by an audience of users. For instance, if a magnitude of a trend is high, the degree of interest by the audience of users may be high. As an example, there may be relatively more users in the audience and those users may be more engaged in content for the particular event, controversy, person, or topic. Conversely, if a magnitude of a trend is low, the degree of interest by the audience of users may be low. As an example, there may be relatively fewer users in the audience and those users may be less engaged in content for the particular event, controversy, person, or topic.

In some examples, distribution module 114 may, in addition to re-distributing user content to client devices as described above, send targeted content to client devices for display. Targeted content may include, but is not limited to: advertisements, offers, rewards, discounts, political information, public interest information, entertainment information, sports information, or any other informational content. As shown in FIG. 1, distribution module 112 may send collocated content 110 that includes targeted content and/or distributed user content from other users. Client module 106A may generate a graphical user interface 130 for display that includes information included in collocated content 110, such as user content 134 and targeted message 136. In some examples, user interface 130 outputs information in a sequence or stream of "cards" or graphical user elements 132A-132D (hereinafter, "cards 132"). The sequence or stream of "cards" may be ordered in chronological or reverse chronological order, in some examples. As shown in FIG. 1, card 132B includes an icon 138A and user content 134. Card 132C includes an icon 138B and targeted message 136. Icon 138A may correspond to the particular user that shared or re-shared user content 134. Icon 138B may correspond to the particular content provider that provided targeted message 136.

As shown in FIG. 1, targeted message 136 may be interspersed with other user content in graphical user interface 130. Accordingly, if a user is viewing a sequence or stream of cards, such as cards 132, information distribution system 112 may also include one or more cards with targeted content. As an example, if the sequence or stream of cards is associated with a specific topic, targeted content that is relevant to the specific topic may be included in the sequence or stream of cards.

As shown in FIG. 1, system 100 also includes computing device 120. Computing device 120 may implement techniques of this disclosure to create and output, for display at client device 102A, targeted content that includes a carousel portion. Computing device 120 may be implemented as one or more computing devices, including but not limited to: desktop computers, laptop computers, mainframes, servers, cloud computing systems, and the like.

In some examples, information distribution system 112 may receive targeted content from content providers operating one or more content provider systems, such as computing device 120. Content providers may include advertising agencies, companies, public interest organizations, governments, individual persons, and political candidates, to name only a few examples. Such content providers may be interested in providing target content to users of information distribution system 112. More particularly, content providers may be interested in generating and displaying targeted content to specific audiences (e.g., sets of users of information distribution system 112) that are highly engaged or interested in a particular event, controversy, person, or topic.

Computing device 120 may include data and one or more modules, which, when executed, perform one or more operations in accordance with the techniques of this disclosure. For example purposes, computing device 120 includes interest module 124 and targeted content 126; however, computing device 120 may include more or fewer modules or data in other examples. Targeted content 126 may include data representing user accounts, demographic data about each user, user-generated content regarding a particular product, brand, or product market, and interest scores that represent a likelihood that a user of client device 102A would interact with an instance of targeted content 126 if it included a particular brand message.

Computing device 120 may also include interest module 124. Interest module 124 may construct and maintain information generated by users and/or operators of computing device 120. Interest module 124 may receive user content 108 from information distribution system 112, and store and organize the user content within computing device 120 at targeted content 126. The user content may be stored and organized using any number of datastores and data structures, such as but not limited to graphs, lists, tables, a Relational Database Management System (RDBMS), Object Database Management System (ODBMS), and/or Online Analytical Processing (OLAP) system.

Each of the messages received by interest module 124 of computing device 120 may be composed by one or more users of the one or more client devices accessing a social media platform on information distribution system 112. Further, each of the messages may include a reference to a particular brand. For instance, in the example of FIG. 1, the particular brand may be for a particular candy. As such, each of the messages may include a reference to the brand of the particular candy. For instance, a message may include any words describing the particular brand, the particular candy, or any other market identifier that one would ordinarily associate with the particular brand or candy, such as a slogan for the candy or a trademarked word or phrase. In some examples, information distribution system 112 may only send messages to computing device 120 that include the references to the particular brand. In other instances, information distribution system 112 may send a larger group of messages to computing device 120. In such instances, interest module 124 of computing device 120 may pare down the received group of messages by disregarding any messages that do not include reference to the particular brand.

The first group of one or more messages received by interest module 124 may include a candidate message. Interest module 124 may determine an interest score for the candidate message using a machine learning model, the interest score being based at least in part on content of the candidate message. In some instances, the interest score may be specific to a user of a client device that will receive a targeted message. In other instances, the interest score may be generally applicable to a group of client devices or all client devices. In general, the interest score represents a likelihood that a user would interact with a targeted message if the targeted message included the candidate message as part of the targeted message's content. For instance, if the candidate message was drafted by a user of a social networking platform that is not influential (e.g., the user does not have a large number of subscribers to their social media account), or the content of the candidate message includes multiple grammatical errors, then interest module 124 may determine that the interest score for the candidate message is low. Conversely, if the candidate message was drafted by a user of a social networking platform that is very influential (e.g., the user has millions of subscribers to their social media account, like a celebrity) and the content of the candidate message is creative, well-crafted, and grammatically sound, then interest module 124 may determine that the interest score is very high.

In the example scenario of FIG. 1, a celebrity with a large amount of subscribers to their social media account may generate a candidate message that includes a creative and favorable reference to the particular brand of candy. The candidate message may also include media, such as audio, a video, a picture (e.g., a joint photographic group (JPG) file, a joint photographic expert group (JPEG) file, a tagged image file format (TIFF) file, a portable network graphics (PNG) file, etc.), or an animated image file (e.g., a graphics interchange format (GIF) file, an animated PNG (APNG) file, a multiple-image network graphics (MNG) file, a scalable vector graphics (SVG) file. etc.). Based on this information, interest module 124 may determine that the candidate message has a high interest score that satisfies a threshold interest score. Responsive to this determination, interest module 124 may insert the candidate message into a group of one or more brand messages. Each brand message in the group of one or more brand messages includes a reference to the particular brand. In other words, each of the brand messages is a candidate message that references the particular brand and has an interest score that satisfies the previously referenced threshold interest score.

Interest module 124 may send, to information distribution system 112, a targeted message to be output for display at client device 102A. The targeted message may include an original portion and a carousel portion. The original portion may merely include content formed at computing device 120. The carousel portion may include a group of one or more transitional windows, where each transitional window in the group of one or more transitional windows includes one of the brand messages in the group of one or more brand messages. Each of the one or more transitional windows contain user-generated content, enabling client device 102A to show multiple user-generated endorsements of and/or media describing a specific product or brand. Such targeted content may provide users of client device 102A with a compact yet detailed message that includes both content formed at computing device 120 and a series of user-generated content referencing a particular product, brand, or market. An illustration of an example targeted message is shown in further detail with respect to FIGS. 3A and 3B.

In the example of FIG. 1, interest module 124 may send a targeted message to information distribution system 112. The original portion of the targeted message may include content generated by a user of computing device 120 describing the particular brand of candy. Interest module 124 may further include multiple transitional windows in the targeted message. One such transitional window may include the candidate message drafted by the celebrity with a large amount of subscribers to their social media account. Other transitional windows may include other brand messages that satisfy the threshold interest score. Client device 102A may output the targeted message such that the original portion of the targeted message is static in the graphical user interface. Client device 102A may output the carousel portion such that a single transitional window is fully visible, but also such that client device 102A may transition between the transitional windows dynamically, either automatically after a certain amount of time or in response to receiving an indication of user input. This allows multiple additional pieces of content to be present in a single message without excessively wasting area on the graphical user interface at client device 102A. By including the group of transitional windows that each include separate brand messages, each of which may further include media, computing device 120 may increase the effectiveness of targeted messages by increasing the amount and variety of the content within the content provider's targeted messages without necessarily crowding the graphical user interface with larger message windows.

As shown in FIG. 1, each of cards 132 is displayed such that a vertical transition occurs on UI component 104A when scrolling between cards 132. However, targeted message 136, which includes the carousel portions, is displayed such that a horizontal transition occurs on UI component 104A when scrolling between transitional windows of the group of one or more transitional windows. This creates a distinguishing visual effect that makes targeted message 136 easier to interact with and places targeted message 136 in a more noticeable position within the message stream displayed in user interface 130.

Figure 2:
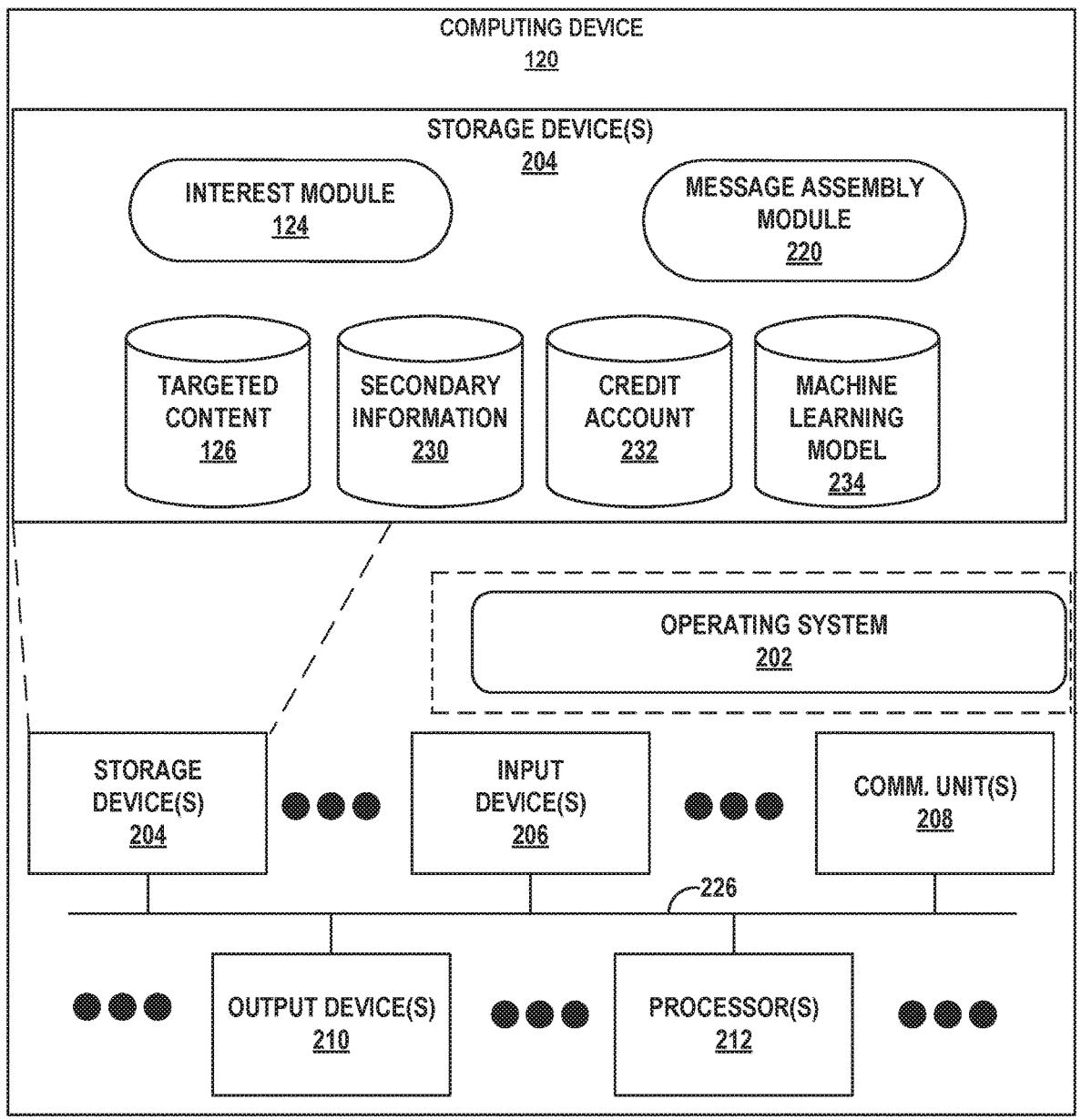
FIG. 2 is a block diagram illustrating further details of an example a computing device that is configured to create and output, for display at one or more client devices, targeted content that includes a carousel portion, in accordance with one or more aspects of the present disclosure.

FIG. 2 is a block diagram illustrating further details of an example a computing device that is configured to create and output, for display at client devices, targeted content that includes a carousel portion, in accordance with one or more aspects of the present disclosure. Computing device 120 of FIG. 2 is described below within the context of FIG. 1. FIG. 2 illustrates only one particular example of computing device 120, and many other examples of computing device 120 may be used in other instances and may include a subset of the components included in example computing device 120 or may include additional components not shown in FIG. 1.

As shown in the example of FIG. 2, computing device 120 includes message assembly module 220, interest module 124, targeted content 126, secondary information 230, credit account 232, machine learning model 234, operating system 202, one or more storage devices 204, one or more input devices 206, one or more communication units 208, one or more output devices 210, one or more processors 212, and one or more communication channels 226.

Communication channels 226 may interconnect each of the components 202-234 for inter-component communications (physically, communicatively, and/or operatively). In some examples, communication channels 226 may include a system bus, a network connection, an inter-process communication data structure, or any other method for communicating data.

One or more input devices 206 of computing device 120 may receive input and one or more output devices 210 may generate output. Examples of input are tactile, audio, and video input and examples of output are tactile, audio, and video output. In one example, input devices 206 include a presence-sensitive display, touch-sensitive screen, mouse, keyboard, voice responsive system, video camera, microphone, or any other type of device for detecting input from a human or machine. Whereas in one example, output devices 210 include a presence-sensitive display, sound card, video graphics adapter card, speaker, cathode ray tube (CRT) monitor, liquid crystal display (LCD), or any other type of device for generating output to a human or machine.

One or more communication units 208 may allow computing device 120 to communicate, via one or more wired and/or wireless networks, with external devices and/or systems, such as information distribution system 112. For example, communication units 208 may transmit and/or receive network signals being transmitted and received other devices and/or systems connected to network 128. Examples of communication units 208 include network interface cards (e.g. such as an Ethernet card), optical transceivers, radio frequency transceivers, GPS receivers, or any other type of device that can send and/or receive information via a network. Other examples of communication units 208 may include long and short wave radios, cellular data radios, wireless network radios, as well as universal serial bus (USB) controllers.

One or more storage devices 204 of computing device 120 may store information or instructions that computing device 120 processes during operation of computing device 120. For example, storage devices 204 may store data that modules or components may access during execution at computing device 120. In some examples, storage devices 204 are temporary memories, meaning that a primary purpose of storage devices 204 is not long-term storage.

Storage devices 204 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 204 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 204, in some examples, include one or more computer-readable storage media. In some examples, storage devices 204 represent non-transitory computer readable storage medium that store instructions later executed by one or more processors 212 during operation of computing device 120. For example, storage devices 204 may store program instructions and/or information (e.g., data) associated with modules and/or components 124, 126, 220, 230, 232, 234, and 202.

One or more processors 212 may implement functionality and/or execute instructions within computing device 120. For example, processors 212 on computing device 120 may receive and execute instructions stored by storage devices 204 that execute the functionality of modules 124, 126, 220, 230, 232, 234, and 202. The instructions executed by processors 212 may cause computing device 120 to read/write/etc. information, such as one or more data files at targeted content 126 and/or secondary information 230 and/or credit account 232 and/or machine learning model 234 and stored within storage devices 204 during program execution. Processors 212 may execute instructions of modules 124, 220, and 202 to cause computing device 120 to perform the operations described in this disclosure. That is, modules 124, 220, and 202 may be operable by processors 212 to perform various actions or functions of computing device 120, for instance, generating and dispersing targeted content that includes an original portion and a carousel portion, in accordance with one or more aspects of the present disclosure.

Interest module 124 may receive user content 108 from information distribution system 112, and store and organize the user content within computing device 120 at targeted content 126. Targeted content 126 may be stored and organized using any number of datastores and data structures, such as but not limited to graphs, lists, tables, a Relational Database Management System (RDBMS), Object Database Management System (ODBMS), and/or Online Analytical Processing (OLAP) system.

Each of the messages received by interest module 124 of computing device 120 may be composed by one or more users of the one or more client devices accessing a social media platform. Further, each of the messages may include a reference to a particular brand. For instance, in the example of FIG. 2, the particular brand may be for a particular basketball shoe. As such, each of the messages may include a reference to the brand of the particular basketball shoe. For instance, a message may include any words describing the particular brand, the particular shoe itself, or any other market identifier that one would ordinarily associate with the particular brand or shoe, such as a slogan for the shoe or a trademarked word or phrase. In some examples, information distribution system 112 may only send messages to computing device 120 that include the references to the particular brand. In other instances, information distribution system 112 may send a larger group of messages to computing device 120. In such instances, interest module 124 of computing device 120 may pare down the received group of messages by disregarding any messages that do not include reference to the particular brand.

The first group of one or more messages received by interest module 124 may include a candidate message. Interest module 124 may determine, using machine learning module 234, an interest score for the candidate message based at least in part on content of the candidate message. In some instances, the interest score may be specific to a user of a client device that will receive a targeted message. In other instances, the interest score may be generally applicable to a group of client devices or all client devices. In general, the interest score represents a likelihood that a user would interact with a targeted message if the targeted message included the candidate message as part of the targeted message's content. For instance, if the candidate message was drafted by a user of a social networking platform that is not influential (e.g., the user does not have a large number of subscribers to their social media account), or the content of the candidate message includes multiple grammatical errors, then interest module 124 may determine that the interest score for the candidate message is low. Conversely, if the candidate message was drafted by a user of a social networking platform that is very influential (e.g., the user has millions of subscribers to their social media account, like a celebrity) and the content of the candidate message is creative, well-crafted, and grammatically sound, then interest module 124 may determine that the interest score is very high.

In general, the interest score may be indicative of a strength of a relation between the content of the candidate message and a particular product belonging to the particular brand. In other words, if the content of the candidate message closely describes or directly references a product of the particular brand or the particular brand in general, interest module 124 may determine a relatively higher interest score for the candidate message. Conversely, if the content of the candidate message does not reference the particular brand or loosely references the market to which the particular brand belongs, then interest module 124 may determine a relatively lower interest score.

In some examples, interest module 124 may incorporate secondary information stored in secondary information 230 when determining the interest score. For instance, secondary information for the candidate message may include an author of the candidate message (e.g., including the market power of the author), a number of subscribers to a social media account of the author of the candidate message, a probability that a user of a client device of the second group of one or more client devices will engage with the candidate message, an interaction history between the user of the client device of the second group of one or more client devices and the author of the candidate message, a time that the candidate message was authored, a geolocation of a client device of the first group of one or more client devices used by the author of the candidate message to post the candidate message, or a topic of the candidate message. Interest module 124 may utilize the secondary information to determine the interest score for the candidate message.

For instance, if the candidate message is authored by a famous user with a large number of subscribers, was authored by a user with similar interests to the targeted user, was authored by a user who the targeted user has interacted with in the past, was composed recently, was composed at a geographical location close to a geolocation of the targeted user, or is regarding a topic of interest to the targeted user, to list only a few non-limiting examples, interest module 124 may increase the interest score for the candidate message. Conversely, if the candidate message is authored by a pedestrian user with a small number of subscribers, was authored by a user with different interests than the targeted user, was authored by a user who the targeted user has never interacted with in the past, was composed multiple years prior to the current date, was composed at a geographical location far away from a geolocation of the targeted user, or is regarding a topic that does not interest the targeted user, interest module 124 may, in these examples, decrease the interest score for the candidate message. In some instances, a user of computing device 120 may further mark particular messages for being included in the set of brand messages or remove particular messages from being included in the set of brand messages.

Machine learning techniques may include any techniques that enable interest module 124 to update machine learning model 234 and its vocabulary to more accurately and more efficiently identify messages that reference a particular product market, a particular brand within the product market, or a particular product for the brand, and to determine an interest score for the messages determined to reference said products or brands. For instance, interest module 124 may utilize one or more of decision tree learning, association rule learning, artificial neural networks, deep learning, inductive logic programming, support vector machines, clustering, Bayesian networks, reinforcement learning, representation learning, similarity and metric learning, sparse dictionary learning, and/or rule-based machine learning in implementing machine learning techniques and machine learning model 234. Interest module 124 may utilize machine learning techniques to analyze messages and separate messages into the correct product market and determining interest scores for the particular message, especially when brands and/or products have names that are exceptionally similar (e.g., the difference between a fruit and a technology company).

Machine learning model 234 may further be updated to alter how the interest score itself is determined. For instance, based on messages that receive user interactions, interest module 124 may update machine learning model 234 to better predict the types of accounts that would influence the user to be more likely to interact with the targeted message or less likely to interact with the targeted message, such that the targeted message includes brand messages that the user is more likely to interact with. Interest module 124 may further update machine learning model 234 to better predict the type of language or the type of products that the user is more likely to interact with.

Additionally, when the targeted message is created based on a selected trend, interest module 124 may be configured to update machine learning model 234 to determine which accounts associated with that trend may have an influence on the user, including optimal positions for original content to be placed within the carousel portion of the trend such that the user is most likely to interact with the original content for a brand associated with the selected trend.

One example machine learning model 234 that interest module 124 may leverage includes a neural network system. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

A neural network system may receive multiple input feature values and process the input feature values to generate one or more network outputs. Each input feature value may describe a particular feature of an input data item, and each network output may describe a computed property of the input data item. For example, an input feature value may describe a common product market, or a particular brand and/or product. As another example, an input feature value may describe a feature, e.g., a count of likes, a count of shares, a count of occurrence of a particular word or phrase, and so on, of a social media posting, e.g., a tweet, and a network output may describe a predicted user interest for a particular user in the social media posting. Each input feature value belongs to an input feature value type and has a raw value. An input feature value type indicates the feature of the input data item that the corresponding input feature value describes. The raw value in an input feature value is a value assigned to the input feature value type.

The neural network system may include a discretization layer, a sparse calibration layer, and one or more additional layers. The discretization layer determines a total range of values for each input feature value type and discretizes these features prior to being fed into the main deep neural network. A total range of values for an input feature value type includes a minimum value and a maximum value for the input feature value type. The discretization layer can determine a minimum and a maximum value of input feature values belonging to an input feature value type in a collection of input training data as the minimum value and the maximum value for the input feature value type respectively. The discretization layer can also use a predetermined minimum value and maximum value for the input feature values belonging to a particular input feature value type as the minimum value and the maximum value for the particular input feature value type respectively. The discretization layer divides, for each input feature value type, the total range of values for the input feature value type into multiple bins, e.g., multiple bins that each include an equal range of possible values. Each bin includes a range of possible values in the total range of values for the input feature value type.

By converting an input feature value to multiple discretized feature values that each has a significant variance in value, the neural network system can increase the significance of the feature values used by the additional layers to make inferences and generate multiple useful pieces of information from the input feature value. By doing this, the neural network system can increase the accuracy of inferences made by the additional layers. This technique is especially useful for processing collections of input feature values that are generally sparse, e.g., generally include mostly zero or low values.

A sparse calibration layer of the neural network system obtains the discretized feature values and generates refined feature values by normalizing the discretized feature values to generate normalized feature values and applying a type-specific bias value to each normalized feature value. This layer has two main extras compared to other sparse layers out there, namely an online normalization scheme that prevents gradients from exploding, and a per-feature bias to distinguish between the absence of a feature and the presence of a zero-valued feature. The sparse calibration layer can normalize a discretized feature value by dividing a value associated with a discretized value type of the discretized feature value by a maximum value for the input feature value type that corresponds to an input feature value using which the discretized feature value is generated. The sparse calibration layer also applies, e.g., adds, a type-specific bias value to each normalized feature value. A type-specific bias value is associated with a particular input feature value type and is common to all normalized feature values that are generated using input feature values belonging to the particular input feature value type.

Another layer of the neural network system may include a sampling scheme layer associated with a calibration layer. Stacked neural networks usually explore the space of solutions much better when the training dataset contains a similar number of positive and negative examples. However, hand-tuning a training dataset in this manner may lead to uncalibrated output predictions. Thus, a custom isotonic calibration layer may recalibrate and output actual probabilities.

The additional layers of the neural network system may include one or more other neural network layers, such as one or more feedforward fully-connected layers, one or more feedforward convolutional layers, one or more recurrent layers, one or more testing layers, one or more softmax layers, one or more calibration layers, and the likes. The additional layers process the refined feature values to generate the network outputs.

A training engine can train the sparse calibration layer and the additional layers using any neural network training algorithm, such as a training algorithm that relies on back-propagation with gradient descent. The training engine can use observed data, such as observed data about user engagement and/or interest in a social media posting through likes, re-sharings, and so on, as the target output data for training.

Machine learning models that include, or wholly comprise, neural networks may be specifically suited for use in large-scale social media platforms with heavy latency. Neural networks may provide the machine learning capability to update dictionaries and contexts for common product markets, specific brands, and specific products, while operating in an environment that requires low latency and high accuracy in order to provide at least a satisfactory user experience.

Deep learning models, such as the stacked neural network system described above, are models that are intrinsically modular. Deep learning modules may be composed in various ways (stacked, concatenated, etc.) to form a computational graph. The parameters of this graph may then be learned, such as by using back-propagation and stochastic gradient descent on mini-batches.

Low-level modules used by deep learning models that may be any hardware or software module configured to compute the output from input and necessary gradients. Some such modules may perform basic operations on chunks of data, potentially letting the user specify the algorithm in its preferred tensor manipulation package, and trusting the library to generate the computational graph itself. In other examples, the computational graph may be dynamic and change from one mini-batch to the other. Deep learning techniques may also be scalable, as these models learn from mini-batches of data, the total dataset size can be arbitrarily large.

Interest module 124 may also utilize a user feedback system, where messages that are incorrectly included in the first group of one or more messages, as indicated by users of the system, are analyzed. Interest module 124 may determine particular language used in the incorrect messages to build its contextual knowledge, removing future messages that include similar language from consideration when determining the engagement score. Similarly, interest module 124 may receive an indications of user input to include particular messages that were previously excluded. In such instances, interest module 124 may analyze the language of such messages to determine particular language used in the correct messages to build its contextual knowledge, including future messages that include similar language for consideration when determining the engagement score.

In some instances, upon determining the interest score, interest module 124 may save an indication of the interest score for the candidate message in machine learning model 234. Interest module 124 may reference machine learning model 234 in future instances of determining the interest score for the candidate message.

In the example scenario of FIG. 2, a celebrity with a large number of subscribers to their social media account may generate a candidate message that includes a creative and favorable reference to the particular brand of basketball shoe. The candidate message may also include media, such as a picture, an animated image file, or a video. Based on this information, interest module 124 may determine that the candidate message has a high interest score that satisfies a threshold interest score. Responsive to this determination, message assembly module 220 may insert the candidate message into a group of one or more brand messages. Each brand message in the group of one or more brand messages includes a reference to the particular brand. In other words, each of the brand messages is a candidate message that references the particular brand and has an interest score that satisfies the previously referenced threshold interest score.

Conversely, a user with very few subscribers to their social media account may generate a candidate message that includes a negative reference to the particular brand of basketball shoe, or a positive reference to the particular brand of basketball shoe but with numerous typographical errors. Based on this information, interest module 124 may determine that the candidate message has a low interest score that does not satisfy the threshold interest score. Responsive to this determination, message assembly module 220 may refrain from inserting the candidate message into the group of one or more brand messages.

Message assembly module 220 may send, to information distribution system 112, a targeted message to be output for display at client device 102A. The targeted message may include an original portion and a carousel portion. The original portion may merely include content formed at computing device 120. The carousel portion may include a group of one or more transitional windows, where each transitional window in the group of one or more transitional windows includes one of the brand messages in the group of one or more brand messages. Each of the one or more transitional windows contain user-generated content, enabling client device 102A to show multiple user-generated endorsements of and/or media describing a specific product or brand. Such targeted content may provide users of client device 102A with a compact yet detailed message that includes both content formed at computing device 120 and a series of user-generated content referencing a particular product, brand, or market. An illustration of an example targeted message is shown in further detail with respect to FIGS. 3A and 3B.

For the targeted message, each transitional window of the group of one or more transitional windows may include a distinct graphical element that contains a respective brand message of the group of one or more brand messages and information identifying a user who composed the respective brand message. For instance, the candidate message described above (i.e., the candidate message that satisfies the threshold interest score) may have a designated transitional window to display the content of the candidate message and information identifying the author of the candidate message. Each remaining transitional window may include a separate brand message where interest module 124 determined that the brand message satisfied the threshold interest score. The carousel portion that contains the transitional windows may be displayed within the targeted message such that only a single transitional window of the group of one or more transitional windows is fully displayed at a given time. A client device in the second group of one or more client devices is configured to individually and cyclically display each transitional window in the group of one or more transitional windows during a period of time, with the transitional windows being configured to scroll horizontally across the device's display. This horizontal scrolling is in contrast to the remainder of the messages in the message stream belonging to the user, which scroll vertically. The original portion may be displayed within the targeted message statically. The original portion may be content created, generated, or inserted by a user of computing device 120.

In some examples, the client device of the second group of one or more client devices that displays the targeted message may cycle through the various transitional windows. In some instances, the client device may cycle the carousel portion automatically after a predetermined amount of time such that a different transitional window of the group of one or more transitional windows is shown in a graphical user interface at the client device. For instance, each transitional window may be displayed for a certain time, such as three to five seconds, before cycling to a different transitional window.

In other instances, the client device may cycle the carousel portion responsive to receiving an indication of user input at the client device such that a different transitional window of the group of one or more transitional windows is shown in a graphical user interface at the client device. In other words, the user of the client device may provide some indication of user input, such as a tap or a swipe gesture, to cycle through the various transitional windows in the carousel portion of the targeted message.

In some examples, a brand message in the group of one or more brand messages used to create the one or more transitional windows in the carousel portion of the message may include various forms of media that may be displayed at the client device that receives the targeted message. In some instances, the media may include one of audio, a video, a picture (e.g., a joint photographic group (JPG) file, a joint photographic expert group (JPEG) file, a tagged image file format (TIFF) file, a portable network graphics (PNG) file, etc.), or an animated image file (e.g., a graphics interchange format (GIF) file, an animated PNG (APNG) file, a multiple-image network graphics (MNG) file, a scalable vector graphics (SVG) file. etc.). In the instances where the media includes the audio, the video, or the animated image file, the client device that outputs the targeted message for display may automatically play the included media file when the client device displays the transitional window that includes the brand message with the given media file.

In the example of FIG. 2, message assembly module 220 may send a targeted message to information distribution system 112. The original portion of the targeted message may include content generated by a user of computing device 120 describing the particular brand of basketball shoe. Message assembly module 220 may further include multiple transitional windows in the targeted message. One such transitional window may include the candidate message drafted by the celebrity with a large number of subscribers to their social media account. Other transitional windows may include other brand messages that satisfy the threshold interest score. Client device 102A may output the targeted message such that the original portion of the targeted message is static in the graphical user interface. Client device 102A may output the carousel portion such that a single transitional window is fully visible, but also such that client device 102A may transition between the transitional windows dynamically, either automatically after a certain amount of time or in response to receiving an indication of user input. This allows multiple additional pieces of content to be present in a single message without excessively wasting area on the graphical user interface at client device 102A. By including the group of transitional windows that each include separate brand messages, each of which may further include media, computing device 120 may increase the effectiveness of targeted messages by increasing the amount and variety of the content within the content provider's targeted messages without necessarily crowding the graphical user interface with larger message windows.

In some instances, the user of the client device that receives the targeted message may engage with the targeted message, such as viewing the media included in the targeted message, disseminating the targeted message to one or more subscribers of a social media account associated with the targeted message, viewing the targeted message, or visiting a webpage from a hyperlink present in the targeted message, to name only a few examples. In such instances, interest module 124 may receive, from information distribution system 112, an indication that the user of the client device of the second group of one or more client devices engaged with the targeted message. In some instances, responsive to receiving the indication that the user of the client device of the second group of one or more client devices engaged with the targeted message, interest module 124 may update the data stored in machine learning model 234 to indicate that the user of the client device engaged with the targeted message. In doing so, interest module 124 may increase the interest score in machine learning model 234 such that similar targeted messages are sent to the client device in the future. Conversely, if interest module 124 does not receive an indication that the user engaged with the targeted message, interest module 124 may decrease the interest score in machine learning model 234 such that different targeted messages are sent to the client device in the future.

In some instances, credit account 232 associated with computing device 120 may profit from users engaging with targeted messages. In such instances, responsive to receiving the indication that the user of the client device of the second group of one or more client devices engaged with the targeted message, credit account 232 of computing device 120 may receive a credit from an account associated with information distribution system 112. The credit may be monetary or some other point or note, either of monetary value or of no monetary value.

In some examples, prior to the receipt of the first group of one or more messages, computing device 120 may initially receive an indication of user input from a particular client device of the second group of one or more client devices that indicates a selection of a trend that may be related to the particular brand. As such, each of the messages in the first group of one or more messages includes content associated with the trend. As such, interest module 124 may construct the carousel portion of the targeted message by placing a distinct graphical element that contains a respective brand message of the group of one or more brand messages and information identifying a user who composed the respective brand message into a respective transitional window of the group of one or more transitional windows, forming an additional transitional window that includes the original portion of the targeted message, and adding the additional transitional window to the group of one or more transitional windows to form an expanded group of two or more transitional windows. Interest module 124 may send, to the information distribution system, the targeted message to be output for display at the particular client device of the second group of one or more client devices. The targeted message is displayed such that only a single transitional window of the expanded group of two or more transitional windows is fully displayed at a given time, such that the particular client device of the second group of one or more client devices is configured to individually and cyclically display each transitional window in the expanded group of two or more transitional windows during a period of time, and such that a transition between the transitional windows of the expanded group of two or more transitional windows is a horizontal transition.

In other words, a user may select a trend on the social media platform, or a particular subject that a large portion of accounts on the social media platform (either globally or at some granularity of locality) are including in messages dispersed via the social media platform at a relatively same time (e.g., within a particular time frame of one another). In some examples, the selected trend may have a connection to a particular brand. For instance, an athlete may be a "trend" for making a game-winning play, and the athlete may have a contract with a particular brand of shoe that the athlete wears during games. As such, if a user selects the trend of the athlete to view messages drafted by users discussing the athlete, the particular brand of shoe may draft the original portion of the targeted message to include information about the athlete's signature shoe sold by the particular brand of shoe. This original portion of the targeted message may be included in one of the transitional windows, and may be visible when the user who selected the trend scrolls through the carousel portion of transitional windows.

Figure 3A:
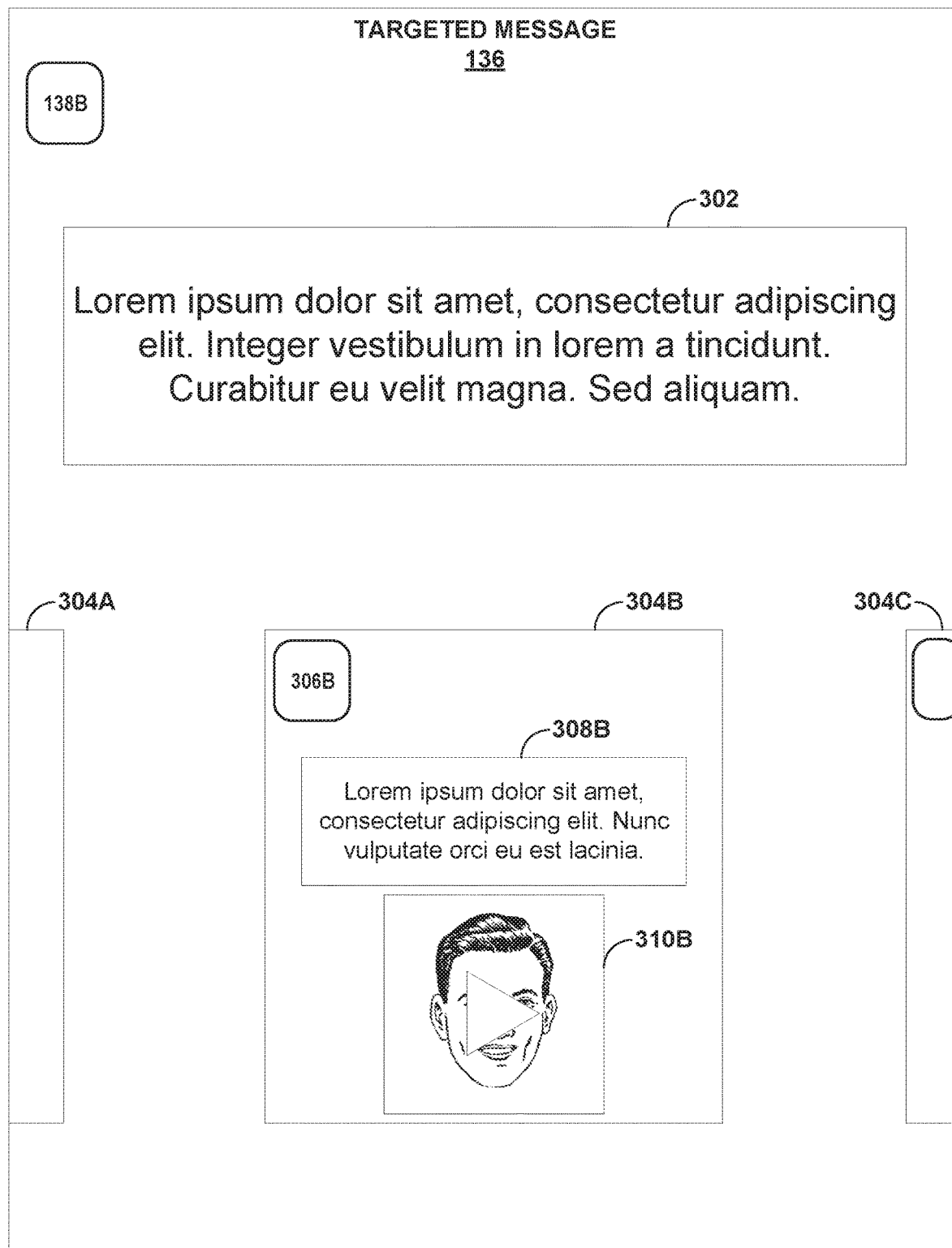
FIGS. 3A-3B are conceptual diagrams of example targeted messages that include respective carousel portions to be displayed at one or more client devices, in accordance with one or more techniques of the disclosure.
Figure 3B:
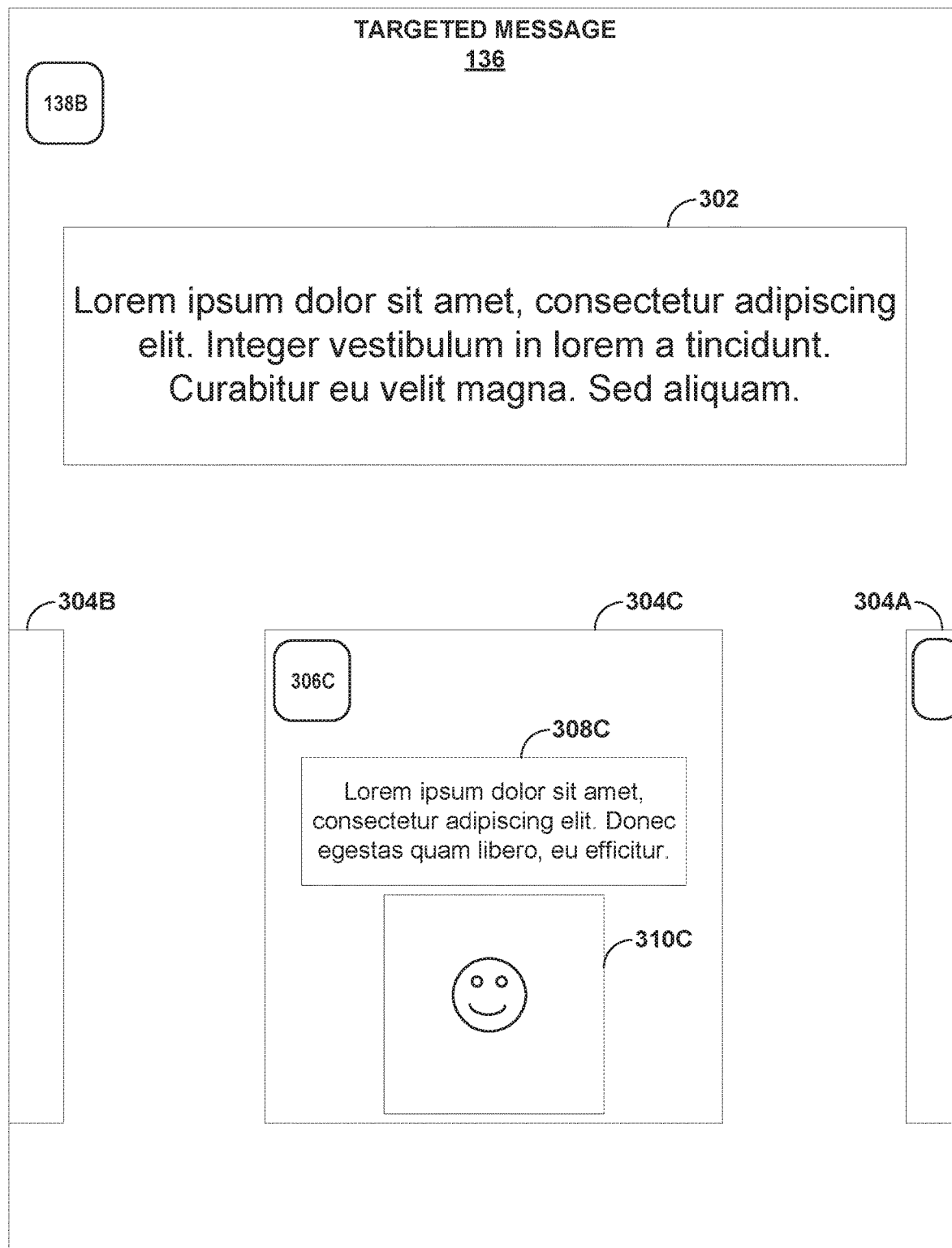

FIGS. 3A-3B are conceptual diagrams of targeted messages that include a carousel portion to be displayed at client devices, in accordance with one or more techniques of the disclosure. For purposes of illustration only, the example operations are described below within the context of computing device 120, as shown in FIGS. 1 and 2.

FIG. 3A shows targeted message 136. Components of computing device 120, such as message assembly module 220, may construct targeted message 136 and send it to a client device via information distribution system 112. Targeted message 136 may be displayed at the recipient client device.

Targeted message 136 may include icon 138B. Icon 138B may include identifying information of the author of the targeted message 136, such as a user or social media account associated with computing device 120. Icon 138B may include one or more of a picture identifier or a textual identifier, such as a name or a social media account handle.

Targeted message 136 includes original portion 302. Original portion 302 may include content formed at computing device 120. For instance, original portion 302 may be content created, generated, or inserted by a user of computing device 120. In the instance of FIG. 3A, original portion 302 includes text authored by the user of computing device 120. However, in other instances, original portion 302 may, instead or in addition, include media files, such as audio, a video, a picture (e.g., a joint photographic group (JPG) file, a joint photographic expert group (JPEG) file, a tagged image file format (TIFF) file, a portable network graphics (PNG) file, etc.), or an animated image file (e.g., a graphics interchange format (GIF) file, an animated PNG (APNG) file, a multiple-image network graphics (MNG) file, a scalable vector graphics (SVG) file. etc.).

Original portion 302 may remain static while targeted message 136 is displayed at the client device. In other words, while other portions of targeted message 136 may be configured to cycle in the display, original portion 302 may remain displayed regardless of which of transitional windows 304A-304C is fully displayed.

Targeted message 136 may further include a carousel portion. In the example of FIGS. 3A and 3B, the carousel portion may include a plurality of transitional windows 304A-304C. Each of transitional windows 304A-304C may include a respective brand message, where computing device 120 determines that each respective brand message has an interest score that satisfies a threshold interest score, as described above with respect to FIGS. 1 and 2. Transitional windows 304A-304C may be displayed such that the client device that displays the targeted message may scroll through transitional windows 304A-304C horizontally across the device's display. This horizontal scrolling is in contrast to the remainder of the messages in the message stream belonging to the user, which scroll vertically across the device's display.

The recipient client device that displays targeted message 136 may be configured to cycle between transitional windows 304A-304C when displaying targeted message 136. In some examples, only one of transitional windows 304A-304C may be displayed at any time. In other instances, such as the example of FIG. 3A, only one or transitional windows 304A-304C may be fully displayed at one time, while one or more remaining transitional windows are at least partially visible. For instance, in FIG. 3A, transitional window 304B is fully displayed, while transitional windows 304A and 304C are partially displayed.

Transitional window 304B may include icon 306B. Icon 306B may include identifying information of the author of the brand message, such as a user or social media account associated with the author. Icon 306B may include one or more of a picture identifier or a textual identifier, such as a name or a social media account handle.

Transitional window 304B further includes a brand message that includes textual message 308B and media file 310B. Textual message 308B and media file 310B may be content formed at a computing device associated with the user identified by icon 310B. In some other instances, the brand message may instead include only one of textual message 308B or media file 310B.

Media file 310B may be any of audio, a video, a picture, or an animated image file. In some examples, if media file 310B is audio, a video or an animated image file, the client device displaying targeted message 136 may automatically play media file 310B upon the client device cycling targeted message 136 to fully display transitional window 304B.

FIG. 3B shows the same targeted message 136 described above in FIG. 3A, but after the displaying client device has cycled the carousel portion of targeted message 136 to display transitional window 304C. In some instances, the client device may cycle the carousel portion automatically after a predetermined amount of time such that transitional window 304C is shown in a graphical user interface at the client device in place of transitional window 304B (now shown mostly hidden on the left side of the graphical user interface). For instance, transitional window 304B may be displayed for a certain time, such as three to five seconds, before automatically cycling to transitional window 304C.

In other instances, the client device may cycle the carousel portion responsive to receiving an indication of user input at the client device, such that transitional window 304C is shown in a graphical user interface at the client device instead of transitional window 304B. In other words, the user of the client device may provide some indication of user input, such as a tap or a swipe gesture, to cycle through the various transitional windows 304A-304C in the carousel portion of targeted message 136.

If the client display is showing the final transitional window 304C of the group of transitional windows, continued scrolling may loop to subsequently display the first transitional window 304A of the group of transitional windows. Conversely, if the client display is showing the first transitional window 304A of the group of transitional windows, scrolling in the reverse direction may cause the client display to output the final transitional window 304C of the group of transitional windows.

Transitional window 304C may include icon 306C. Icon 306C may include identifying information of the author of the brand message, such as a user or social media account associated with the author. Icon 306C may include one or more of a picture identifier or a textual identifier, such as a name or a social media account handle.

Transitional window 304C further includes a brand message that includes textual message 308C and media file 310C. Textual message 308C and media file 310C may be content formed at a computing device associated with the user identified by icon 310C. In some other instances, the brand message may instead include only one of textual message 308C or media file 310C.

Media file 310C may be any of audio, a video, a picture, or an animated image file. In some examples, if media file 310C is audio, a video, or an animated image file, the client device displaying targeted message 136 may automatically play media file 310C upon the client device cycling targeted message 136 to fully display transitional window 304C.

Figure 4A:
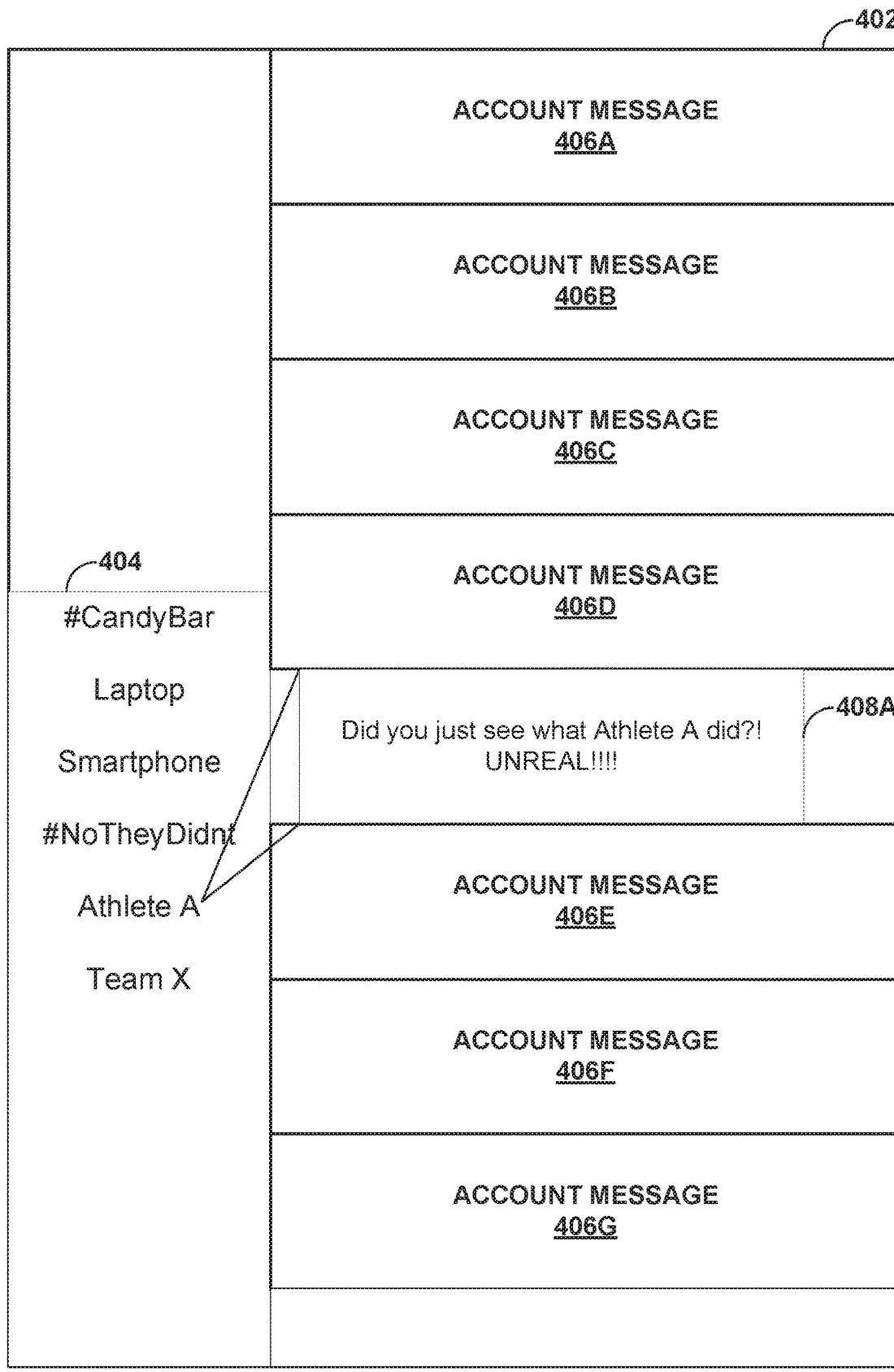
FIGS. 4A-4B are conceptual diagrams of example message streams that include targeted messages that include respective carousel portions to be displayed at one or more client devices, in accordance with one or more techniques of the disclosure.
Figure 4B:
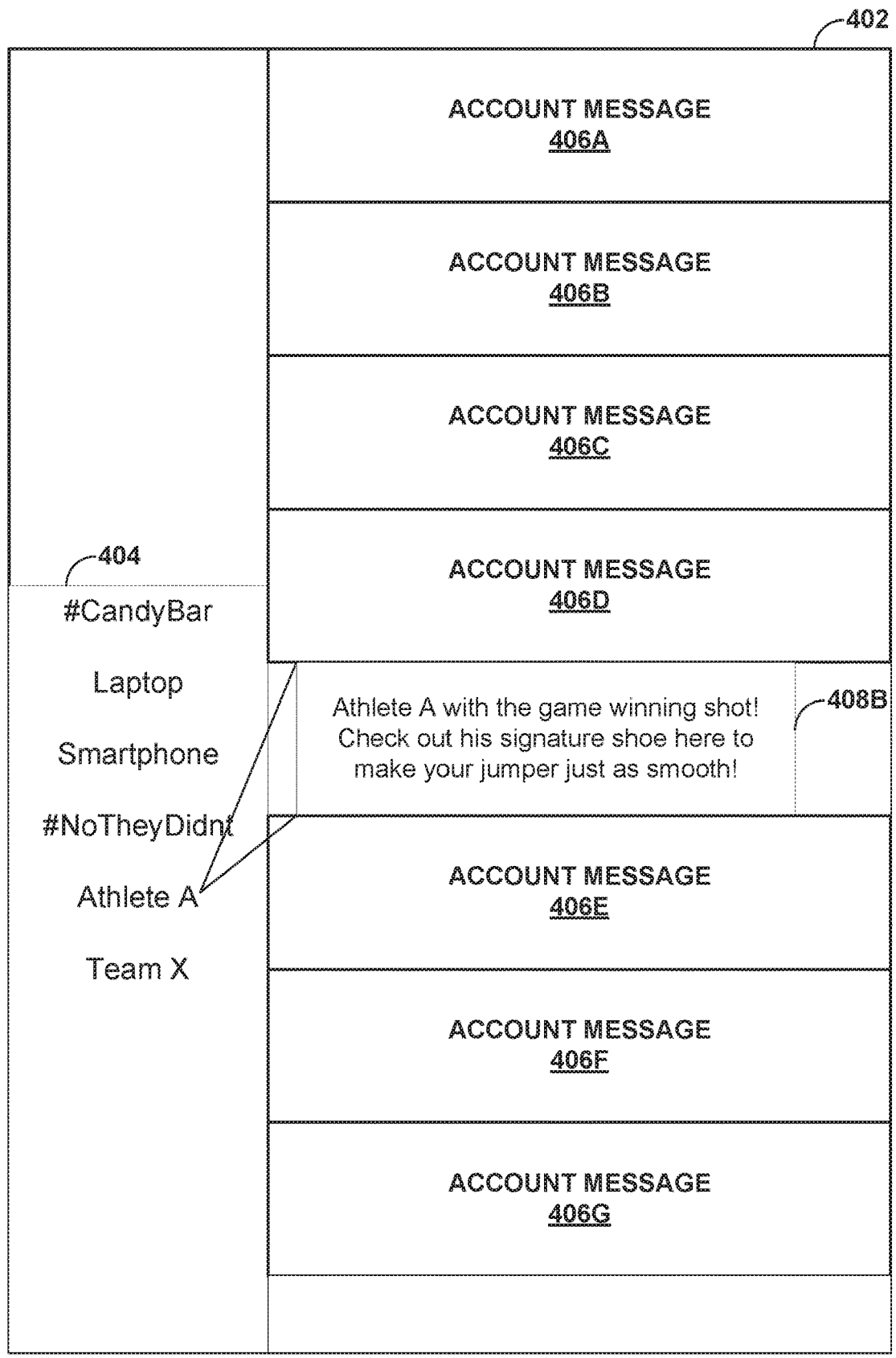

FIGS. 4A-4B are conceptual diagrams of targeted messages 408A-408B that include a carousel portion to be displayed at a client device based on a selected trend, in accordance with one or more techniques of the disclosure. A trend on the social media platform may be a particular subject that a large portion of accounts on the social media platform (either globally or at some granularity of locality) are including in messages dispersed via the social media platform at a relatively same time (e.g., within a particular time frame of one another). Like carousel content curation, trend detection for triggering carousel creation is implemented by leverage machine learning that predicts trends based on any combination of time (freshness), topicality, trustworthiness, geolocation, user preferences and past actions, as well as any other feature that may inform about user interest.

One compelling trigger is a trending topic, or a trend, about a news-breaking event, programmatically detectable by a spike in a velocity graph of a number of messages over time. In this case, the platform generates, in real-time and while the event is still breaking, a carousel that includes both user generated content and news publisher content describing and commenting about the event and embeds that carousel into timelines of users who the platform predicts would be interested.

In some examples, prior to the receipt of the first group of one or more messages, computing device 120 may initially receive an indication of user input from a particular client device of the second group of one or more client devices that indicates a selection of a trend that may be related to the particular brand. As such, each of the messages in the first group of one or more messages includes content associated with the trend. As such, interest module 124 may construct the carousel portion of the targeted message by placing a distinct graphical element that contains a respective brand message of the group of one or more brand messages and information identifying a user who composed the respective brand message into a respective transitional window of the group of one or more transitional windows, forming an additional transitional window that includes the original portion of the targeted message, and adding the additional transitional window to the group of one or more transitional windows to form an expanded group of two or more transitional windows. Interest module 124 may send, to the information distribution system, the targeted message to be output for display at the second group of one or more client devices. The targeted message is displayed such that only a single transitional window of the expanded group of two or more transitional windows is fully displayed at a given time, such that a client device in the second group of one or more client devices is configured to individually and cyclically display each transitional window in the expanded group of two or more transitional windows during a period of time, and such that a transition between the transitional windows of the expanded group of two or more transitional windows is a horizontal transition.

In other words, a user may select a trend on the social media platform. In some examples, the selected trend may have a connection to a particular brand. For instance, an athlete may be a "trend" for making a game-winning play, and the athlete may have a contract with a particular brand of shoe that the athlete wears during games. As such, if a user selects the trend of the athlete to view messages drafted by users discussing the athlete, the particular brand of shoe may draft the original portion of the targeted message to include information about the athlete's signature shoe sold by the particular brand of shoe. This original portion of the targeted message may be included in one of the transitional windows, and may be visible when the user who selected the trend scrolls through the carousel portion of transitional windows.

In the example of FIG. 4A, user interface 402 is displayed on a particular client device. User interface 402 includes trend list 404 and account messages 406A-406G, account messages 406A-406G shown in a vertically scrolling message stream. At one point, the user of the client device may provide an indication of user input selecting "Athlete A" as a trend. In other examples, a user may select any "trend" that describes any topic that may be popular on the social media site.

After selecting the trend "Athlete A" a computing device, such as computing device 120 of FIG. 1, may send a targeted message to the client device such that each transitional window of a carousel portion of the targeted message includes a different drafted message regarding the trend. The carousel portion may also include an original portion drafted by a user of computing device 120. Transitional window 408A may be displayed initially, which includes a reaction to a play completed by Athlete A in a sporting event.

The transitional windows in the carousel portion of the targeted message may scroll horizontally, in contrast to the vertical scrolling of account messages 406A-406G. In some examples, while the targeted message is being displayed, account messages 406A-406G may be static, restricting the vertical scrolling in favor of the distinguishable horizontal scrolling of the transitional windows.

In the example of FIG. 4B, the client device horizontally transitioned to show transitional window 408B. Transitional window 408B includes the original portion of the targeted message, drafted by a particular brand of shoe that is associated with computing device 120 or by a marketing company hired by the particular brand of shoe. The original portion in transitional window 408B encourages the user to view Athlete A's signature shoe, capitalizing on Athlete A's current newsworthiness.

Figure 5:
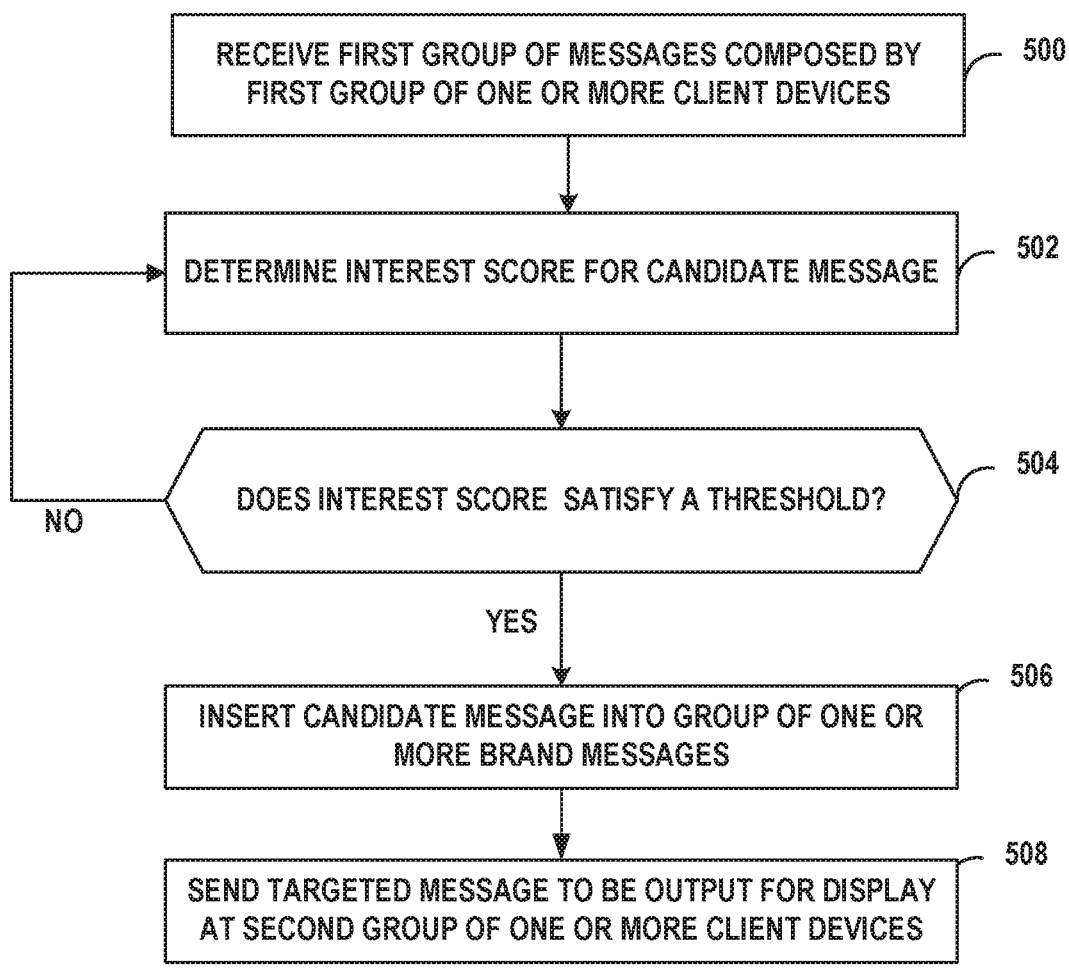
FIG. 5 is a flow diagram illustrating example operations of a computing device that implements techniques to create and output, for display at one or more client devices, targeted content that includes a carousel portion, in accordance with one or more aspects of the present disclosure.

FIG. 5 is a flow diagram illustrating example operations of a computing device that implements techniques to create and output, for display at client devices, targeted content that includes a carousel portion, in accordance with one or more aspects of the present disclosure. For purposes of illustration only, the example operations are described below within the context of computing device 120, as shown in FIGS. 1 and 2.

Interest module 124 may receive (500) a first group of one or more messages composed by a first group of one or more client devices from information distribution system 112, and store and organize the user content within computing device 120 at targeted content 126. Targeted content 126 may be stored and organized using any number of datastores and data structures, such as but not limited to graphs, lists, tables, a Relational Database Management System (RDBMS), Object Database Management System (ODBMS), and/or Online Analytical Processing (OLAP) system.

Each of the messages received by interest module 124 of computing device 120 may be composed by one or more users of the one or more client devices accessing a social media platform. Further, each of the messages may include a reference to a particular brand. For instance, in the example of FIG. 5, the particular brand may, for purposes of illustration only, be for a particular soft drink. As such, each of the messages may include a reference to the brand of the particular soft drink. For instance, a message may include any words describing the particular brand, the particular soft drink itself, or any other market identifier that one would ordinarily associate with the particular brand or soft drink, such as a slogan for the soft drink or a trademarked word or phrase. In some examples, information distribution system 112 may only send messages to computing device 120 that include the references to the particular brand. In other instances, information distribution system 112 may send a larger group of messages to computing device 120. In such instances, interest module 124 of computing device 120 may pare down the received group of messages by disregarding any messages that do not include reference to the particular brand.

The first group of one or more messages received by interest module 124 may include a candidate message. Interest module 124 may determine (502), using a machine learning model, an interest score for the candidate message based at least in part on content of the candidate message. In some instances, the interest score may be specific to a user of a client device that will receive a targeted message. In other instances, the interest score may be generally applicable to a group of client devices or all client devices. In general, the interest score represents a likelihood that a user would interact with a targeted message if the targeted message included the candidate message as part of the targeted message's content. For instance, if the candidate message was drafted by a user of a social networking platform that is not influential (e.g., the user does not have a large number of subscribers to their social media account), or the content of the candidate message includes multiple grammatical errors, then interest module 124 may determine that the interest score for the candidate message is low. Conversely, if the candidate message was drafted by a user of a social networking platform that is very influential (e.g., the user has millions of subscribers to their social media account, like a celebrity), and the content of the candidate message is creative, well-crafted, and grammatically sound, then interest module 124 may determine that the interest score is very high.

In general, the interest score may be indicative of a strength of a relation between the content of the candidate message and a particular product belonging to the particular brand. In other words, if the content of the candidate message closely describes or directly references a product of the particular brand or the particular brand in general, interest module 124 may determine a relatively higher interest score for the candidate message. Conversely, if the content of the candidate message does not reference the particular brand or loosely references the market to which the particular brand belongs, then interest module 124 may determine a relatively lower interest score.

In some examples, interest module 124 may incorporate secondary information stored in secondary information 230 when determining the interest score. For instance, secondary information for the candidate message may include an author of the candidate message, a number of subscribers to a social media account of the author of the candidate message, a probability that a user of a client device of the second group of one or more client devices will engage with the candidate message, an interaction history between the user of the client device of the second group of one or more client devices and the author of the candidate message, a time that the candidate message was authored, a geolocation of a client device of the first group of one or more client devices used by the author of the candidate message to post the candidate message, or a topic of the candidate message. Interest module 124 may utilize the secondary information to determine the interest score for the candidate message.

For instance, if the candidate message is authored by a famous user with a large number of subscribers, was authored by a user with similar interests to the targeted user, was authored by a user who the targeted user has interacted with in the past, was composed recently, was composed at a geographical location close to a geolocation of the targeted user, or is regarding a topic of interest to the targeted user, interest module 124 may increase the interest score for the candidate message. Conversely, if the candidate message is authored by a pedestrian user with a small number of subscribers, was authored by a user with different interests than the targeted user, was authored by a user who the targeted user has never interacted with in the past, was composed multiple years prior to the current date, was composed at a geographical location far away from a geolocation of the targeted user, or is regarding a topic that does not interest the targeted user, interest module 124 may decrease the interest score for the candidate message.

In some instances, upon determining the interest score, interest module 124 may save an indication of the interest score for the candidate message in machine learning model 234. Interest module 124 may reference machine learning model 234 in future instances of determining the interest score for the candidate message.

Interest module 124 may determine (504) whether the interest score satisfies a threshold interest score. For instance, in the example scenario of FIG. 5, a celebrity with a large number of subscribers to their social media account may generate a candidate message that includes a creative and favorable reference to the particular brand of soft drink. The candidate message may also include media, such as a picture, an animated image file, or a video. Based on this information, interest module 124 may determine that the candidate message has a high interest score that satisfies a threshold interest score ("YES" branch of 504). Responsive to this determination, message assembly module 220 may insert (506) the candidate message into a group of one or more brand messages. Each brand message in the group of one or more brand messages includes a reference to the particular brand. In other words, each of the brand messages is a candidate message that references the particular brand and has an interest score that satisfies the previously referenced threshold interest score.

Conversely, a user with very few subscribers to their social media account may generate a candidate message that includes a negative reference to the particular brand of soft drink, or a positive reference to the particular brand of soft drink but with numerous typographical errors. Based on this information, interest module 124 may determine that the candidate message has a low interest score that does not satisfy the threshold interest score. Responsive to this determination, message assembly module 220 may refrain from inserting the candidate message into the group of one or more brand messages and determine ("NO" branch of 502) an interest score for a subsequent candidate message.

Message assembly module 220 may send (508), to information distribution system 112, a targeted message to be output for display at client device 102A. The targeted message may include an original portion and a carousel portion. The original portion may merely include content formed at computing device 120. The carousel portion may include a group of one or more transitional windows, where each transitional window in the group of one or more transitional windows includes one of the brand messages in the group of one or more brand messages. Each of the one or more transitional windows contain user-generated content, enabling client device 102A to show multiple user-generated endorsements of and/or media describing a specific product or brand. Such targeted content may provide users of client device 102A with a compact yet detailed message that includes both content formed at computing device 120 and a series of user-generated content referencing a particular product, brand, or market.

For the targeted message, each transitional window of the group of one or more transitional windows may include a distinct graphical element that contains a respective brand message of the group of one or more brand messages and information identifying a user who composed the respective brand message. For instance, the candidate message described above (i.e., the candidate message that satisfies the threshold interest score) may have a designated transitional window to display the content of the candidate message and information identifying the author of the candidate message. Each remaining transitional window may include a separate brand message where interest module 124 determined that the brand message satisfied the threshold interest score. The carousel portion that contains the transitional windows may displayed within the targeted message such that only a single transitional window of the group of one or more transitional windows is fully displayed at a given time. A client device in the second group of one or more client devices is configured to individually and cyclically display each transitional window in the group of one or more transitional windows during a period of time. The original portion may be displayed within the targeted message statically. The original portion may be content created, generated, or inserted by a user of computing device 120.

In some examples, the client device of the second group of one or more client devices that displays the targeted message may cycle through the various transitional windows. In some instances, the client device may cycle the carousel portion automatically after a predetermined amount of time such that a different transitional window of the group of one or more transitional windows is shown in a graphical user interface at the client device. For instance, each transitional window may be displayed for a certain time, such as three to five seconds, before cycling to a different transitional window.

In other instances, the client device may cycle the carousel portion responsive to receiving an indication of user input at the client device such that a different transitional window of the group of one or more transitional windows is shown in a graphical user interface at the client device. In other words, the user of the client device may provide some indication of user input, such as a tap or a swipe gesture, to cycle through the various transitional windows in the carousel portion of the targeted message.

In some examples, a brand message in the group of one or more brand messages used to create the one or more transitional windows in the carousel portion of the message may include various forms of media that may be displayed at the client device that receives the targeted message. In some instances, the media may include one of a video, a picture, or an animated image file. In the instances where the media includes the audio, the video, or the animated image file, the client device that outputs the targeted message for display may automatically play the included media file when the client device displays the transitional window that includes the brand message with the given media file.

The original portion of the targeted message may include content generated by a user of computing device 120 describing the particular brand of soft drink. Message assembly module 220 may further include multiple transitional windows in the targeted message. One such transitional window may include the candidate message drafted by the celebrity with a large numbers of subscribers to their social media account. Other transitional windows may include other brand messages that satisfy the threshold interest score. Client device 102A may output the targeted message such that the original portion of the targeted message is static in the graphical user interface. Client device 102A may output the carousel portion such that a single transitional window is fully visible, but also such that client device 102A may transition between the transitional windows dynamically, either automatically after a certain amount of time or in response to receiving an indication of user input. This allows multiple additional pieces of content to be present in a single message without excessively wasting area on the graphical user interface at client device 102A. By including the group of transitional windows that each include separate brand messages, each of which may further include media, computing device 120 may increase the effectiveness of targeted messages by increasing the amount and variety of the content within the content provider's targeted messages without necessarily crowding the graphical user interface with larger message windows.

In some instances, the user of the client device that receives the targeted message may engage with the targeted message, such as viewing the media included in the targeted message, disseminating the targeted message to one or more subscribers of a social media account associated with the targeted message, viewing the targeted message, or visiting a webpage from a hyperlink present in the targeted message. In such instances, interest module 124 may receive, from information distribution system 112, an indication that the user of the client device of the second group of one or more client devices engaged with the targeted message. In some instances, responsive to receiving the indication that the user of the client device of the second group of one or more client devices engaged with the targeted message, interest module 124 may update the data stored in machine learning model 234 to indicate that the user of the client device engaged with the targeted message. In doing so, interest module 124 may increase the interest score in machine learning model 234 such that similar targeted messages are sent to the client device in the future. Conversely, if interest module 124 does not receive an indication that the user engaged with the targeted message, interest module 124 may decrease the interest score in machine learning model 234 such that different targeted messages are sent to the client device in the future.

In some instances, credit account 232 associated with computing device 120 may profit from users engaging with targeted messages. In such instances, responsive to receiving the indication that the user of the client device of the second group of one or more client devices engaged with the targeted message, credit account 232 of computing device 120 may receive a credit from an account associated with information distribution system 112. The credit may be monetary or some other point or note, either of monetary value or of no monetary value.

In some examples, prior to the receipt of the first group of one or more messages, computing device 120 may initially receive an indication of user input from a particular client device of the second group of one or more client devices that indicates a selection of a trend that may be related to the particular brand. As such, each of the messages in the first group of one or more messages includes content associated with the trend. As such, interest module 124 may construct the carousel portion of the targeted message by placing a distinct graphical element that contains a respective brand message of the group of one or more brand messages and information identifying a user who composed the respective brand message into a respective transitional window of the group of one or more transitional windows, forming an additional transitional window that includes the original portion of the targeted message, and adding the additional transitional window to the group of one or more transitional windows to form an expanded group of two or more transitional windows. Interest module 124 may send, to the information distribution system, the targeted message to be output for display at the particular client device of the second group of one or more client devices. The targeted message is displayed such that only a single transitional window of the expanded group of two or more transitional windows is fully displayed at a given time, such that the particular client device of the second group of one or more client devices is configured to individually and cyclically display each transitional window in the expanded group of two or more transitional windows during a period of time, and such that a transition between the transitional windows of the expanded group of two or more transitional windows is a horizontal transition.

In other words, a user may select a trend on the social media platform, or a particular subject that a large portion of accounts on the social media platform (either globally or at some granularity of locality) are including in messages dispersed via the social media platform at a relatively same time (e.g., within a particular time frame of one another). In some examples, the selected trend may have a connection to a particular brand. For instance, an athlete may be a "trend" for making a game-winning play, and the athlete may have a contract with a particular brand of shoe that the athlete wears during games. As such, if a user selects the trend of the athlete to view messages drafted by users discussing the athlete, the particular brand of shoe may draft the original portion of the targeted message to include information about the athlete's signature shoe sold by the particular brand of shoe. This original portion of the targeted message may be included in one of the transitional windows, and may be visible when the user who selected the trend scrolls through the carousel portion of transitional windows.

Example 1

A method comprising: receiving, by a computing device and from an information distribution system, a first group of one or more messages composed by one or more users of a first group of one or more client devices accessing a social media platform, wherein each of the messages in the first group of one or more messages includes a reference to a particular brand; determining, by the computing device, using a machine learning model, an interest score for a candidate message based at least in part on content of the candidate message, wherein the candidate message is included in the first group of one or more messages; responsive to determining that the interest score satisfies a threshold interest score, inserting, by the computing device, the candidate message into a group of one or more brand messages, wherein each brand message in the group of one or more brand messages includes a reference to the particular brand; and sending, by the computing device and to the information distribution system, a targeted message to be output for display at a second group of one or more client devices, wherein the targeted message comprises an original portion and a carousel portion, wherein the carousel portion comprises a group of one or more transitional windows, wherein each transitional window in the group of one or more transitional windows includes one of the brand messages in the group of one or more brand messages, and wherein the original portion comprises content formed at the computing device.

Example 2

The method of example 1, wherein determining the interest score comprises: determining, by the computing device, a strength of a relation between the content of the candidate message and a particular product belonging to the particular brand; and determining, by the computing device and based at least in part on the strength of the relation between the content of the candidate message and the particular product belonging to the particular brand, the interest score.

Example 3

The method of any of examples 1-2, wherein each transitional window of the group of one or more transitional windows comprises a distinct graphical element that contains a respective brand message of the group of one or more brand messages and information identifying a user who composed the respective brand message, wherein the original portion is displayed within the targeted message statically, and wherein the carousel portion is displayed within the targeted message such that only a single transitional window of the group of one or more transitional windows is fully displayed at a given time, such that a client device in the second group of one or more client devices is configured to individually and cyclically display each transitional window in the group of one or more transitional windows during a period of time, and such that the transition between the group of one or more transitional windows is a horizontal transition.

Example 4

The method of example 3, further comprising: cycling, by a client device of the second group of one or more client devices, the carousel portion automatically after a predetermined amount of time such that a different transitional window of the group of one or more transitional windows is shown in a graphical user interface at the client device.

Example 5

The method of any of examples 3-4, further comprising: cycling, by a client device of the second group of one or more client devices, the carousel portion responsive to receiving an indication of user input at the client device such that a different transitional window of the group of one or more transitional windows is shown in a graphical user interface at the client device.

Example 6

The method of any of examples 1-5, wherein a brand message in the group of one or more brand messages includes media comprising one of audio, a video, a picture, or an animated image file, and wherein the media is automatically played upon display of the respective transitional window of the group of one or more transitional windows that contains the brand message.

Example 7

The method of any of examples 1-6, further comprising: initially receiving, by the computing device, an indication of user input from a particular client device of the second group of one or more client devices that indicates a selection of a trend, wherein the trend is related to the particular brand, and wherein each of the messages in the first group of one or more messages includes content associated with the trend; constructing, by the computing device, the carousel portion of the targeted message by: placing a distinct graphical element that contains a respective brand message of the group of one or more brand messages and information identifying a user who composed the respective brand message into a respective transitional window of the group of one or more transitional windows, forming an additional transitional window that includes the original portion of the targeted message, and adding the additional transitional window to the group of one or more transitional windows to form an expanded group of two or more transitional windows; and sending, by the computing device and to the information distribution system, the targeted message to be output for display at the particular client device of the second group of one or more client devices, wherein the targeted message is displayed such that only a single transitional window of the expanded group of two or more transitional windows is fully displayed at a given time, such that the particular client device of the second group of one or more client devices is configured to individually and cyclically display each transitional window in the expanded group of two or more transitional windows during a period of time, and such that a transition between the transitional windows of the expanded group of two or more transitional windows is a horizontal transition.

Example 8

The method of any of examples 1-7, further comprising: determining, by the computing device, secondary information for the candidate message, wherein the secondary information comprises one or more of: an author of the candidate message, a number of subscribers to a social media account of the author of the candidate message, a probability that a user of a client device of the second group of one or more client devices will engage with the candidate message, an interaction history between the user of the client device of the second group of one or more client devices and the author of the candidate message, a time that the candidate message was authored, a geolocation of a client device of the first group of one or more client devices used by the author of the candidate message to post the candidate message, or a topic of the candidate message; and determining, by the computing device based at least in part on the content of the candidate message and the secondary information for the candidate message, the interest score.

Example 9

The method of any of examples 1-8, further comprising: receiving, by the computing device and from the information distribution system, an indication that a user of a client device of the second group of one or more client devices engaged with the targeted message, wherein engaging with the targeted message comprises one of viewing the targeted message, disseminating the targeted message to one or more subscribers of a social media account associated with the user, or interacting with one or more hyperlinks included in the targeted message; and updating, by the computing device, the machine learning model to indicate that the user of the client device of the second group of client devices engaged with the targeted message.

Example 10

The method of example 9, further comprising: responsive to receiving the indication that the user of the client device of the second group of one or more client devices engaged with the targeted message, receiving, by an account associated with the computing device, a credit from an account associated with the information distribution system.

Example 11

The method of any of examples 1-10, wherein sending the targeted message to the information distribution system comprises sending, by the computing device and to the information distribution system, a message stream to be output for display at a particular client device of the second group of one or more client devices, wherein the message stream comprises a plurality of messages that includes the targeted message, wherein the message stream is configured to be output for display such that respective graphical indications of the plurality of messages in the message stream are vertically scrollable, and wherein the carousel portion of the targeted message within the message stream is displayed such that the one or more transitional windows are horizontally scrollable.

Example 12

A non-transitory computer-readable storage medium storing instructions that, when executed, cause at least one processor of a computing device to: receive, from an information distribution system, a first group of one or more messages composed by one or more users of a first group of one or more client devices accessing a social media platform, wherein each of the messages in the first group of one or more messages includes a reference to a particular brand; determine, using a machine learning model, an interest score for a candidate message based at least in part on content of the candidate message, wherein the candidate message is included in the first group of one or more messages; responsive to determining that the interest score satisfies a threshold interest score, insert the candidate message into a group of one or more brand messages, wherein each brand message in the group of one or more brand messages includes a reference to the particular brand; and send, to the information distribution system, a targeted message to be output for display at a second group of one or more client devices, wherein the targeted message comprises an original portion and a carousel portion, wherein the carousel portion comprises a group of one or more transitional windows, wherein each transitional window in the group of one or more transitional windows includes one of the brand messages in the group of one or more brand messages, and wherein the original portion comprises content formed at the computing device.

Example 13

The non-transitory computer-readable storage medium of example 12, wherein the instructions that cause the at least one processor to determine the interest score comprise instructions that, when executed, cause the at least one processor to: determine a strength of a relation between the content of the candidate message and a particular product belonging to the particular brand; and determine, based at least in part on the strength of the relation between the content of the candidate message and the particular product belonging to the particular brand, the interest score.

Example 14

The non-transitory computer-readable storage medium of any of examples 12-13, wherein each transitional window of the group of one or more transitional windows comprises a distinct graphical element that contains a respective brand message of the group of one or more brand messages and information identifying a user who composed the respective brand message, wherein the original portion is displayed within the targeted message statically, and wherein the carousel portion is displayed within the targeted message such that only a single transitional window of the group of one or more transitional windows is fully displayed at a given time, such that a client device in the second group of one or more client devices is configured to individually and cyclically display each transitional window in the group of one or more transitional windows during a period of time, and such that the transition between the group of one or more transitional windows is a horizontal transition.

Example 15

The non-transitory computer-readable storage medium of example 14, further comprising instructions that, when executed, cause the at least one processor to: cycle the carousel portion automatically after a predetermined amount of time such that a different transitional window of the group of one or more transitional windows is shown in a graphical user interface at the client device.

Example 16

The non-transitory computer-readable storage medium of any of examples 14-15, further comprising instructions that, when executed, cause the at least one processor to: cycle the carousel portion responsive to receiving an indication of user input at the client device such that a different transitional window of the group of one or more transitional windows is shown in a graphical user interface at the client device.

Example 17

The non-transitory computer-readable storage medium of any of examples 12-16, wherein a brand message in the group of one or more brand messages includes media comprising one of audio, a video, a picture, or an animated image file, and wherein the media is automatically played upon display of the respective transitional window of the group of one or more transitional windows that contains the brand message.

Example 18

The non-transitory computer-readable storage medium of any of examples 12-17, further comprising instructions that, when executed, cause the at least one processor to: initially receive an indication of user input from a particular client device of the second group of one or more client devices that indicates a selection of a trend, wherein the trend is related to the particular brand, and wherein each of the messages in the first group of one or more messages includes content associated with the trend; construct the carousel portion of the targeted message by: placing a distinct graphical element that contains a respective brand message of the group of one or more brand messages and information identifying a user who composed the respective brand message into a respective transitional window of the group of one or more transitional windows, forming an additional transitional window that includes the original portion of the targeted message, and adding the additional transitional window to the group of one or more transitional windows to form an expanded group of two or more transitional windows; and send, to the information distribution system, the targeted message to be output for display at the particular client device of the second group of one or more client devices, wherein the targeted message is displayed such that only a single transitional window of the expanded group of two or more transitional windows is fully displayed at a given time, such that the particular client device of the second group of one or more client devices is configured to individually and cyclically display each transitional window in the expanded group of two or more transitional windows during a period of time, and such that a transition between the transitional windows of the expanded group of two or more transitional windows is a horizontal transition.

Example 19

The non-transitory computer-readable storage medium of any of examples 12-18, further comprising instructions that, when executed, cause the at least one processor to: determine secondary information for the candidate message, wherein the secondary information comprises one or more of: an author of the candidate message, a number of subscribers to a social media account of the author of the candidate message, a probability that a user of a client device of the second group of one or more client devices will engage with the candidate message, an interaction history between the user of the client device of the second group of one or more client devices and the author of the candidate message, a time that the candidate message was authored, a geolocation of a client device of the first group of one or more client devices used by the author of the candidate message to post the candidate message, or a topic of the candidate message; and determine, based at least in part on the content of the candidate message and the secondary information for the candidate message, the interest score.

Example 20

The non-transitory computer-readable storage medium of any of examples 12-19, further comprising instructions that, when executed, cause the at least one processor to: receive, from the information distribution system, an indication that a user of a client device of the second group of one or more client devices engaged with the targeted message, wherein engaging with the targeted message comprises one of viewing the targeted message, disseminating the targeted message to one or more subscribers of a social media account associated with the user, or interacting with one or more hyperlinks included in the targeted message; and update the machine learning model to indicate that the user of the client device of the second group of client devices engaged with the targeted message.

Example 21

The non-transitory computer-readable storage medium of example 20, further comprising instructions that, when executed, cause the at least one processor to: responsive to receiving the indication that the user of the client device of the second group of one or more client devices engaged with the targeted message, receive, by an account associated with the computing device, a credit from an account associated with the information distribution system.

Example 22

The non-transitory computer-readable storage medium of any of examples 12-21, wherein the instructions that cause the at least one processor to send the targeted message to the information distribution system comprise instructions that, when executed, further cause the at least one processor to send, to the information distribution system, a message stream to be output for display at a particular client device of the second group of one or more client devices, wherein the message stream comprises a plurality of messages that includes the targeted message, wherein the message stream is configured to be output for display such that respective graphical indications of the plurality of messages in the message stream are vertically scrollable, and wherein the carousel portion of the targeted message within the message stream is displayed such that the one or more transitional windows are horizontally scrollable.

Example 23

A computing device comprising: at least one processor; and at least one non-transitory computer-readable storage medium storing instructions that are executable by the at least one processor to: receive, from an information distribution system, a first group of one or more messages composed by one or more users of a first group of one or more client devices accessing a social media platform, wherein each of the messages in the first group of one or more messages includes a reference to a particular brand; determine, using a machine learning model, an interest score for a candidate message based at least in part on content of the candidate message, wherein the candidate message is included in the first group of one or more messages; responsive to determining that the interest score satisfies a threshold interest score, insert the candidate message into a group of one or more brand messages, wherein each brand message in the group of one or more brand messages includes a reference to the particular brand; and send, to the information distribution system, a targeted message to be output for display at a second group of one or more client devices, wherein the targeted message comprises an original portion and a carousel portion, wherein the carousel portion comprises a group of one or more transitional windows, wherein each transitional window in the group of one or more transitional windows includes one of the brand messages in the group of one or more brand messages, and wherein the original portion comprises content formed at the computing device.

Example 24

The computing device of example 23, wherein the instructions that are executable by the at least one processor to determine the interest score comprise instructions that are executable by the at least one processor to: determine a strength of a relation between the content of the candidate message and a particular product belonging to the particular brand; and determine, based at least in part on the strength of the relation between the content of the candidate message and the particular product belonging to the particular brand, the interest score.

Example 25

The computing device of any of examples 23-24, wherein each transitional window of the group of one or more transitional windows comprises a distinct graphical element that contains a respective brand message of the group of one or more brand messages and information identifying a user who composed the respective brand message, wherein the original portion is displayed within the targeted message statically, and wherein the carousel portion is displayed within the targeted message such that only a single transitional window of the group of one or more transitional windows is fully displayed at a given time, such that a client device in the second group of one or more client devices is configured to individually and cyclically display each transitional window in the group of one or more transitional windows during a period of time, and such that the transition between the group of one or more transitional windows is a horizontal transition.

Example 26

The computing device of example 25, wherein the non-transitory computer-readable storage medium further stores instructions that are executable by the at least one processor to: cycle the carousel portion automatically after a predetermined amount of time such that a different transitional window of the group of one or more transitional windows is shown in a graphical user interface at the client device.

Example 27

The computing device of any of examples 25-26, wherein the non-transitory computer-readable storage medium further stores instructions that are executable by the at least one processor to: cycle the carousel portion responsive to receiving an indication of user input at the client device such that a different transitional window of the group of one or more transitional windows is shown in a graphical user interface at the client device.

Example 28

The computing device of any of examples 23-27, further comprising instructions executable by the at least one processor to: initially receive an indication of user input from a particular client device of the second group of one or more client devices that indicates a selection of a trend, wherein the trend is related to the particular brand, and wherein each of the messages in the first group of one or more messages includes content associated with the trend; construct the carousel portion of the targeted message by: placing a distinct graphical element that contains a respective brand message of the group of one or more brand messages and information identifying a user who composed the respective brand message into a respective transitional window of the group of one or more transitional windows, forming an additional transitional window that includes the original portion of the targeted message, and adding the additional transitional window to the group of one or more transitional windows to form an expanded group of two or more transitional windows; and send, to the information distribution system, the targeted message to be output for display at the particular client device of the second group of one or more client devices, wherein the targeted message is displayed such that only a single transitional window of the expanded group of two or more transitional windows is fully displayed at a given time, such that the particular client device of the second group of one or more client devices is configured to individually and cyclically display each transitional window in the expanded group of two or more transitional windows during a period of time, and such that a transition between the transitional windows of the expanded group of two or more transitional windows is a horizontal transition.

Example 29

The computing device of any of examples 23-28, wherein the non-transitory computer-readable storage medium further stores instructions that are executable by the at least one processor to: determine secondary information for the candidate message, wherein the secondary information comprises one or more of: an author of the candidate message, a number of subscribers to a social media account of the author of the candidate message, a probability that a user of a client device of the second group of one or more client devices will engage with the candidate message, an interaction history between the user of the client device of the second group of one or more client devices and the author of the candidate message, a time that the candidate message was authored, a geolocation of a client device of the first group of one or more client devices used by the author of the candidate message to post the candidate message, or a topic of the candidate message; and determine, based at least in part on the content of the candidate message and the secondary information for the candidate message, the interest score.

Example 30

The computing device of any of examples 23-29, wherein the non-transitory computer-readable storage medium further stores instructions that are executable by the at least one processor to: receive, from the information distribution system, an indication that a user of a client device of the second group of one or more client devices engaged with the targeted message, wherein engaging with the targeted message comprises one of viewing the targeted message, disseminating the targeted message to one or more subscribers of a social media account associated with the user, or interacting with one or more hyperlinks included in the targeted message; update the machine learning model to indicate that the user of the client device of the second group of client devices engaged with the targeted message; and responsive to receiving the indication that the user of the client device of the second group of one or more client devices engaged with the targeted message, receive, by an account associated with the computing device, a credit from an account associated with the information distribution system.

Example 31

A device comprising means for performing the method of any of examples 1-11.

Example 32

A non-transitory computer-readable storage medium storing instructions that, when executed, cause at least one processor to perform the method of any of examples 1-11.

Example 33

A device comprising at least one module operable by one or more processors to perform the method of any of examples 1-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples of the disclosure have been described. Any combination of the described systems, operations, or functions is contemplated. These and other examples are within the scope of the following claims.

What is claimed is:

1. A method comprising:
   receiving, by a computing device and from an information distribution system, a first group of one or more messages composed by one or more users of a first group of one or more client devices accessing a social media platform, wherein each of the messages in the first group of one or more messages includes a reference to a particular brand;
   determining, by the computing device, using a machine learning model, an interest score for a candidate message based at least in part on content of the candidate message, wherein the candidate message is included in the first group of one or more messages;
   responsive to determining that the interest score satisfies a threshold interest score, inserting, by the computing device, the candidate message into a group of one or more brand messages, wherein each brand message in the group of one or more brand messages includes a reference to the particular brand; and
   sending, by the computing device and to the information distribution system, a targeted message to be output for display at a second group of one or more client devices, wherein the targeted message comprises an original portion and a carousel portion, wherein the carousel portion comprises a group of two or more transitional windows, wherein each transitional window in the group of two or more transitional windows includes one of the brand messages in the group of one or more brand messages, and wherein the original portion comprises content formed at the computing device,
   the method further comprising:
   initially receiving, by the computing device, an indication of user input from a particular client device of the second group of one or more client devices that indicates a selection of a trend, wherein the trend is related to the particular brand, and wherein each of the messages in the first group of one or more messages includes content associated with the trend; and
   constructing, by the computing device, the carousel portion of the targeted message by:
      placing a distinct graphical element that contains a respective brand message of the group of one or more brand messages and information identifying a user who composed the respective brand message into a respective transitional window of the group of two or more transitional windows,
      forming an additional transitional window that includes the original portion of the targeted message, and
      adding the additional transitional window to the group of one or more transitional windows to form an expanded group of three or more transitional windows; and
   sending, by the computing device and to the information distribution system, the targeted message to be output for display at the particular client device of the second group of one or more client devices, wherein the targeted message is displayed such that only a single transitional window of the expanded group of three or more transitional windows is fully displayed at a given time, such that the particular client device of the second group of one or more client devices is configured to individually and cyclically display each transitional window in the expanded group of three or more transitional windows during a period of time, and such that a transition between the transitional windows of the expanded group of three or more transitional windows is a horizontal transition.

2. The method of claim 1, wherein a brand message in the group of two or more brand messages includes media comprising one of audio, a video, a picture, or an animated image file, and wherein the media is automatically played upon display of the respective transitional window of the group of two or more transitional windows that contains the brand message.

3. The method of claim 1, further comprising:
   determining, by the computing device, secondary information for the candidate message, wherein the secondary information comprises one or more of:
   an author of the candidate message,
   a number of subscribers to a social media account of the author of the candidate message,
   a probability that a user of a client device of the second group of one or more client devices will engage with the candidate message,
   an interaction history between the user of the client device of the second group of one or more client devices and the author of the candidate message,
   a time that the candidate message was authored,
   a geolocation of a client device of the first group of one or more client devices used by the author of the candidate message to post the candidate message, or
   a topic of the candidate message; and
   determining, by the computing device based at least in part on the content of the candidate message and the secondary information for the candidate message, using the machine learning model, the interest score.

4. The method of claim 1, further comprising:
   receiving, by the computing device and from the information distribution system, an indication that a user of a client device of the second group of one or more client devices engaged with the targeted message, wherein engaging with the targeted message comprises one of viewing the targeted message, disseminating the targeted message to one or more subscribers of a social media account associated with the user, or interacting with one or more hyperlinks included in the targeted message; and updating, by the computing device, the machine learning model to indicate that the user of the client device of the second group of client devices engaged with the targeted message.

5. The method of claim 4, further comprising:

responsive to receiving the indication that the user of the client device of the second group of one or more client devices engaged with the targeted message, receiving, by an account associated with the computing device, a credit from an account associated with the information distribution system.

6. The method of claim 1, wherein determining the interest score comprises:

determining, by the computing device, a strength of a relation between the content of the candidate message and a particular product belonging to the particular brand; and determining, by the computing device and based at least in part on the strength of the relation between the content of the candidate message and the particular product belonging to the particular brand, the interest score.

7. The method of claim 1, further comprising:

cycling, by a client device of the second group of one or more client devices, the carousel portion automatically after a predetermined amount of time such that a different transitional window of the expanded group of three or more transitional windows is shown in a graphical user interface at the client device.

8. The method of claim 1, further comprising:

cycling, by a client device of the second group of one or more client devices, the carousel portion responsive to receiving an indication of user input at the client device such that a different transitional window of the expanded group of three or more transitional windows is shown in a graphical user interface at the client device.

9. A non-transitory computer-readable storage medium storing instructions that, when executed, cause at least one processor to:

receive, from an information distribution system, a first group of one or more messages composed by one or more users of a first group of one or more client devices accessing a social media platform, wherein each of the messages in the first group of one or more messages includes a reference to a particular brand;

determine, using a machine learning model, an interest score for a candidate message based at least in part on content of the candidate message, wherein the candidate message is included in the first group of one or more messages;

responsive to determining that the interest score satisfies a threshold interest score, insert the candidate message into a group of one or more brand messages, wherein each brand message in the group of one or more brand messages includes a reference to the particular brand; and send, to the information distribution system, a targeted message to be output for display at a second group of one or more client devices, wherein the targeted message comprises an original portion and a carousel portion, wherein the carousel portion comprises a group of two or more transitional windows, wherein each transitional window in the group of two or more transitional windows includes one of the brand messages in the group of one or more brand messages, and wherein the original portion comprises content formed at the computing device, the non-transitory computer-readable storage medium further comprising instructions that, when executed, cause the at least one processor to:

initially receive an indication of user input from a particular client device of the second group of one or more client devices that indicates a selection of a trend, wherein the trend is related to the particular brand, and wherein each of the messages in the first group of one or more messages includes content associated with the trend;

construct the carousel portion of the targeted message by:
placing a distinct graphical element that contains a respective brand message of the group of one or more brand messages and information identifying a user who composed the respective brand message into a respective transitional window of the group of two or more transitional windows, forming an additional transitional window that includes the original portion of the targeted message, and adding the additional transitional window to the group of one or more transitional windows to form an expanded group of three or more transitional windows; and send, to the information distribution system, the targeted message to be output for display at the particular client device of the second group of one or more client devices, wherein the targeted message is displayed such that only a single transitional window of the expanded group of three or more transitional windows is fully displayed at a given time, such that the particular client device of the second group of one or more client devices is configured to individually and cyclically display each transitional window in the expanded group of three or more transitional windows during a period of time, and such that a transition between the transitional windows of the expanded group of three or more transitional windows is a horizontal transition.

10. The non-transitory computer-readable storage medium of claim 9, wherein the instructions that cause the at least one processor to determine the interest score comprise instructions that, when executed, cause the at least one processor to:

determine a strength of a relation between the content of the candidate message and a particular product belonging to the particular brand; and determine, based at least in part on the strength of the relation between the content of the candidate message and the particular product belonging to the particular brand, the interest score.

11. The non-transitory computer-readable storage medium of claim 9, further comprising instructions that, when executed, cause the at least one processor to:

cycle the carousel portion automatically after a predetermined amount of time such that a different transitional window of the group three or more transitional windows is shown in a graphical user interface at the client device.

12. The non-transitory computer-readable storage medium of claim 9, further comprising instructions that, when executed, cause the at least one processor to:

cycle the carousel portion responsive to receiving an indication of user input at the client device such that a different transitional window of the group of three or more transitional windows is shown in a graphical user interface at the client device.

13. The non-transitory computer-readable storage medium of claim 9, wherein a brand message in the group of one or more brand messages includes media comprising one of audio, a video, a picture, or an animated image file, and wherein the media is automatically played upon display of the respective transitional window of the group of two or more transitional windows that contains the brand message.

14. The non-transitory computer-readable storage medium of claim 9, further comprising instructions that, when executed, cause the at least one processor to:
 determine secondary information for the candidate message, wherein the secondary information comprises one or more of:
  an author of the candidate message,
  a number of subscribers to a social media account of the author of the candidate message,
  a probability that a user of a client device of the second group of one or more client devices will engage with the candidate message,
  an interaction history between the user of the client device of the second group of one or more client devices and the author of the candidate message,
  a time that the candidate message was authored,
  a geolocation of a client device of the first group of one or more client devices used by the author of the candidate message to post the candidate message, or
  a topic of the candidate message; and
 determine, based at least in part on the content of the candidate message and the secondary information for the candidate message, using the machine learning model, the interest score.

15. The non-transitory computer-readable storage medium of claim 9, further comprising instructions that, when executed, cause the at least one processor to:
 receive, from the information distribution system, an indication that a user of a client device of the second group of one or more client devices engaged with the targeted message, wherein engaging with the targeted message comprises one of viewing the targeted message, disseminating the targeted message to one or more subscribers of a social media account associated with the user, or interacting with one or more hyperlinks included in the targeted message; and
 update the machine learning model to indicate that the user of the client device of the second group of client devices engaged with the targeted message.

16. The non-transitory computer-readable storage medium of claim 15, further comprising instructions that, when executed, cause the at least one processor to:
 responsive to receiving the indication that the user of the client device of the second group of one or more client devices engaged with the targeted message, receive, by an account associated with the computing device, a credit from an account associated with the information distribution system.

17. A computing device comprising:
 at least one processor; and
 at least one non-transitory computer-readable storage medium storing instructions that are executable by the at least one processor to:
  receive, from an information distribution system, a first group of one or more messages composed by one or more users of a first group of one or more client devices accessing a social media platform, wherein each of the messages in the first group of one or more messages includes a reference to a particular brand;
  determine, using a machine learning model, an interest score for a candidate message based at least in part on content of the candidate message, wherein the candidate message is included in the first group of one or more messages;
  responsive to determining that the interest score satisfies a threshold interest score, insert the candidate message into a group of one or more brand messages, wherein each brand message in the group of one or more brand messages includes a reference to the particular brand; and
  send, to the information distribution system, a targeted message to be output for display at a second group of one or more client devices, wherein the targeted message comprises an original portion and a carousel portion, wherein the carousel portion comprises a group of two or more transitional windows, wherein each transitional window in the group of two or more transitional windows includes one of the brand messages in the group of one or more brand messages, and wherein the original portion comprises content formed at the computing device,
 the computing device further comprising instructions executable by the at least one processor to:
  initially receive an indication of user input from a particular client device of the second group of one or more client devices that indicates a selection of a trend, wherein the trend is related to the particular brand, and wherein each of the messages in the first group of one or more messages includes content associated with the trend;
  construct the carousel portion of the targeted message by:
   placing a distinct graphical element that contains a respective brand message of the group of one or more brand messages and information identifying a user who composed the respective brand message into a respective transitional window of the group of two or more transitional windows,
   forming an additional transitional window that includes the original portion of the targeted message, and
   adding the additional transitional window to the group of one or more transitional windows to form an expanded group of three or more transitional windows; and
  send, to the information distribution system, the targeted message to be output for display at the particular client device of the second group of one or more client devices, wherein the targeted message is displayed such that only a single transitional window of the expanded group of three or more transitional windows is fully displayed at a given time, such that the particular client device of the second group of one or more client devices is configured to individually and cyclically display each transitional window in the expanded group of three or more transitional windows during a period of time, and such that a transition between the transitional windows of the expanded group of three or more transitional windows is a horizontal transition.

18. The computing device of claim 17, wherein the instructions that are executable by the at least one processor to determine the interest score comprise instructions that are executable by the at least one processor to:

determine a strength of a relation between the content of the candidate message and a particular product belonging to the particular brand; and determine, based at least in part on the strength of the relation between the content of the candidate message and the particular product belonging to the particular brand, the interest score.

19. The computing device of claim 17, wherein the non-transitory computer-readable storage medium further stores instructions that are executable by the at least one processor to:

cycle the carousel portion automatically after a predetermined amount of time such that a different transitional window of the group of three or more transitional windows is shown in a graphical user interface at the client device.

20. The computing device of claim 17, wherein the non-transitory computer-readable storage medium further stores instructions that are executable by the at least one processor to:

cycle the carousel portion responsive to receiving an indication of user input at the client device such that a different transitional window of the group of three or more transitional windows is shown in a graphical user interface at the client device.

21. The computing device of claim 17, wherein the non-transitory computer-readable storage medium further stores instructions that are executable by the at least one processor to:

determine secondary information for the candidate message, wherein the secondary information comprises one or more of:

an author of the candidate message, a number of subscribers to a social media account of the author of the candidate message, a probability that a user of a client device of the second group of one or more client devices will engage with the candidate message, an interaction history between the user of the client device of the second group of one or more client devices and the author of the candidate message, a time that the candidate message was authored, a geolocation of a client device of the first group of one or more client devices used by the author of the candidate message to post the candidate message, or a topic of the candidate message; and determine, based at least in part on the content of the candidate message and the secondary information for the candidate message, using the machine learning model, the interest score.

22. The computing device of claim 17, wherein the non-transitory computer-readable storage medium further stores instructions that are executable by the at least one processor to:

receive, from the information distribution system, an indication that a user of a client device of the second group of one or more client devices engaged with the targeted message, wherein engaging with the targeted message comprises one of viewing the targeted message, disseminating the targeted message to one or more subscribers of a social media account associated with the user, or interacting with one or more hyperlinks included in the targeted message;

update the machine learning model to indicate that the user of the client device of the second group of client devices engaged with the targeted message; and responsive to receiving the indication that the user of the client device of the second group of one or more client devices engaged with the targeted message, receive, by an account associated with the computing device, a credit from an account associated with the information distribution system.

\* \* \* \* \*